(12) United States Patent
Imagawa et al.

(10) Patent No.: US 7,907,183 B2
(45) Date of Patent: Mar. 15, 2011

(54) IMAGE GENERATION APPARATUS AND IMAGE GENERATION METHOD FOR GENERATING A NEW VIDEO SEQUENCE FROM A PLURALITY OF VIDEO SEQUENCES

(75) Inventors: Taro Imagawa, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 430 days.

(21) Appl. No.: 12/094,370

(22) PCT Filed: Oct. 24, 2007

(86) PCT No.: PCT/JP2007/070750
§ 371 (c)(1),
(2), (4) Date: May 20, 2008

(87) PCT Pub. No.: WO2008/053765
PCT Pub. Date: May 8, 2008

(65) Prior Publication Data
US 2009/0167909 A1    Jul. 2, 2009

(30) Foreign Application Priority Data

Oct. 30, 2006   (JP) .................................. 2006-294698

(51) Int. Cl.
*H04N 5/225*   (2006.01)
(52) U.S. Cl. .................................. 348/220.1; 348/222.1
(58) Field of Classification Search ................ 348/220.1, 348/154, 153, 441, 458, 901, 362; 375/240.24, 375/240.25
See application file for complete search history.

(56) References Cited

U.S. PATENT DOCUMENTS 7,596,177 B2 *   9/2009  Imagawa et al. ......... 375/240.03
2003/0227545 A1  12/2003  Soya et al.
2005/0219642 A1  10/2005  Yachida et al.
(Continued)

FOREIGN PATENT DOCUMENTS

EP         1 583 357         10/2005
(Continued)

OTHER PUBLICATIONS

International Search Report issued Nov. 20, 2007 in the International (PCT) Application of which the present application is the U.S. National Stage.

*Primary Examiner* — Nelson D. Hernández Hernández
(74) *Attorney, Agent, or Firm* — Wenderoth, Lind & Ponack, L.L.P.

(57) ABSTRACT

Provided is an image generation apparatus that generates a new video sequence from video sequences including image regions for which corresponding point detection and motion estimation cannot be performed correctly. The image generation apparatus includes: an exposure control unit which controls an image capturing apparatus to temporally change an exposure amount in a part of an exposure period; an image receiving unit which receives the first video sequence and the second video sequence captured under the control of the exposure control unit; an image integration unit which generates, from these video sequences, the new video sequence having a resolution equal to or higher than the second resolution, at a frame rate equal to or higher than the first video sequence. The second video sequence has higher resolution than the first video sequence, and the second video sequence has a frame exposure time period longer than the first video sequence.

8 Claims, 37 Drawing Sheets

U.S. PATENT DOCUMENTS

| | | |
|---|---|---|
| 2005/0239548 A1 | 10/2005 | Ueshima et al. |
| 2007/0189386 A1 | 8/2007 | Imagawa et al. |
| 2009/0263044 A1 * | 10/2009 | Imagawa et al. .............. 382/275 |

FOREIGN PATENT DOCUMENTS

| | | |
|---|---|---|
| JP | 11-234644 | 8/1999 |
| JP | 2003-203237 | 7/2003 |
| JP | 2004-40422 | 2/2004 |
| JP | 2004-64661 | 2/2004 |
| JP | 2004-85524 | 3/2004 |
| JP | 2005-318548 | 11/2005 |
| JP | 3934151 | 6/2007 |
| WO | 2006/137253 | 12/2006 |

* cited by examiner

FIG. 6
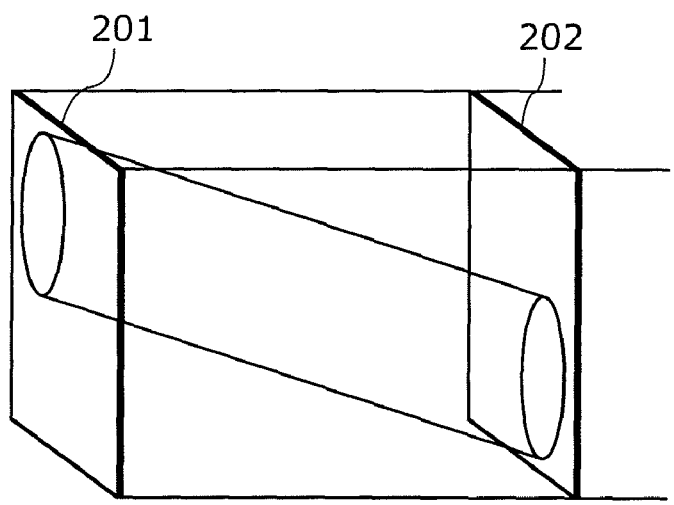
(a) Frames of low-speed and high-resolution video sequence
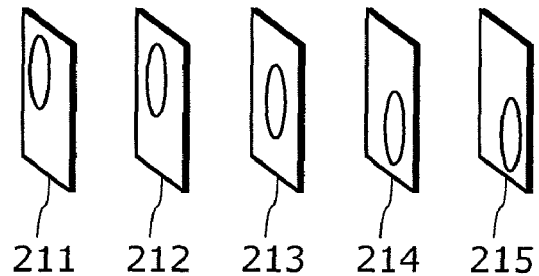
(b) Frames of high-speed and low-resolution video sequence
211  212  213  214  215
Time

FIG. 7
(a) Two-camera system
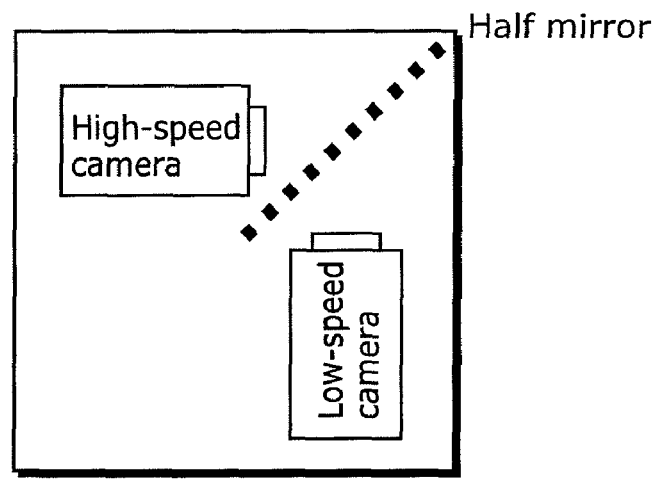
(b) Two-element system
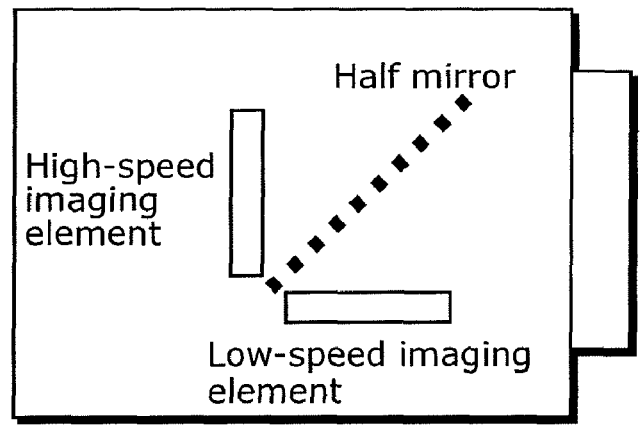
(c) One-element system
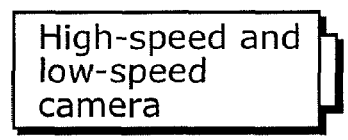

(a)

High-speed and high-resolution video sequence HH(x, y, t)

(b)

High-speed and low-resolution video sequence HL($x_L$, $y_L$, t)

(c)

Low-speed and high-resolution video sequence LH(x, y, $t_L$)

FIG. 9
(a)
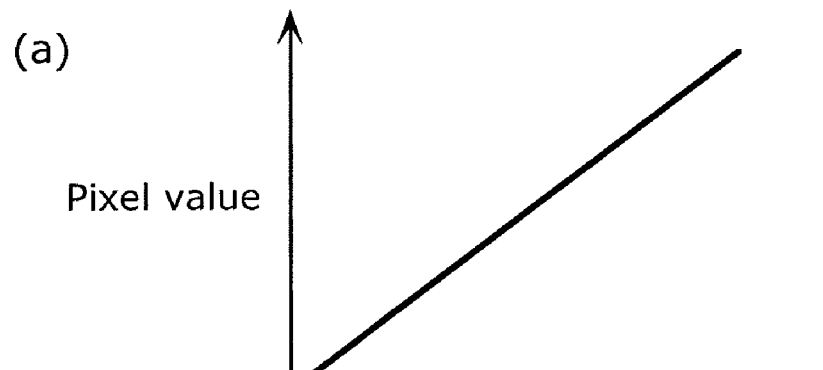
(b)
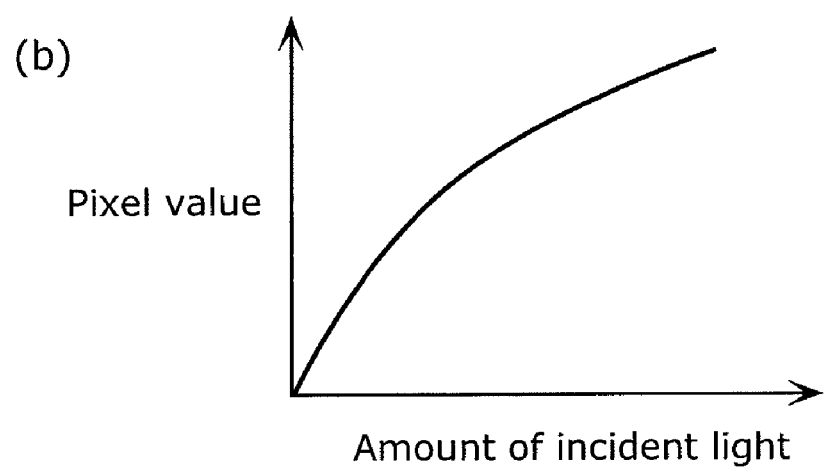
(c)
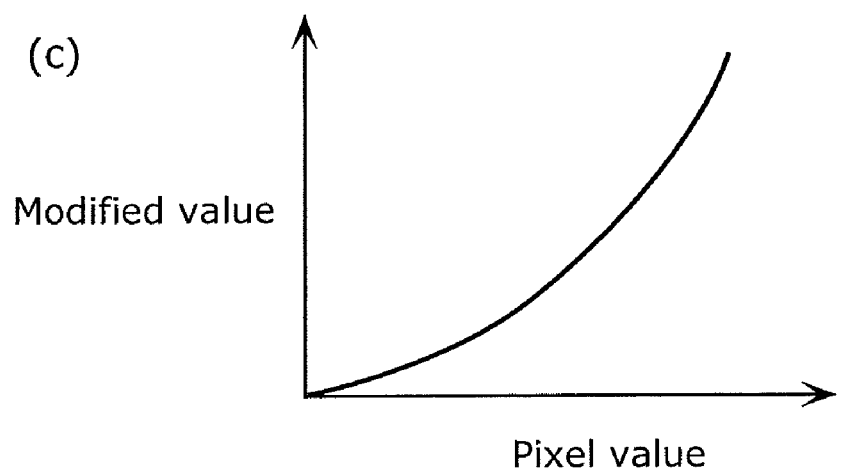

FIG. 10
(a) Frame t
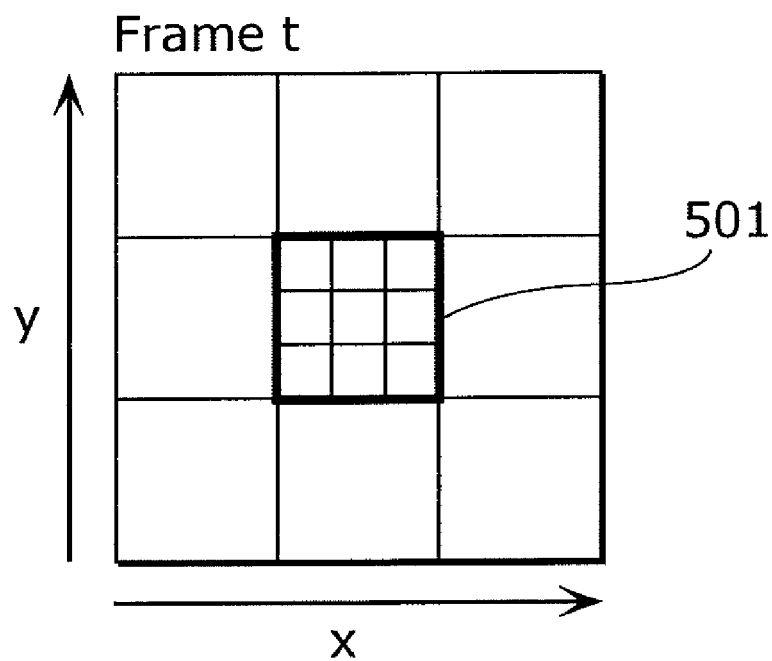
(b) Frame t+1
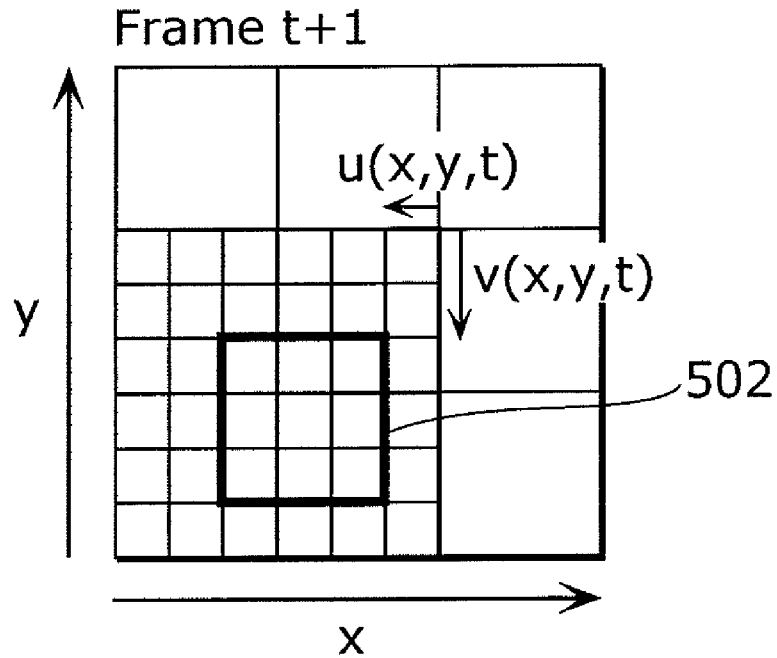

FIG. 15
(a) 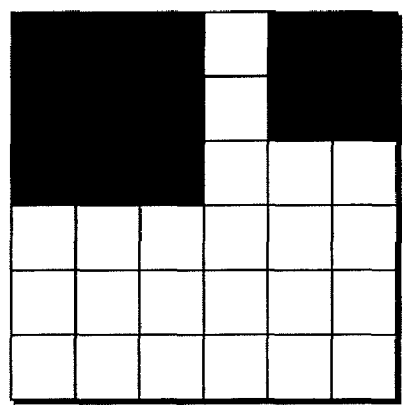
(b) 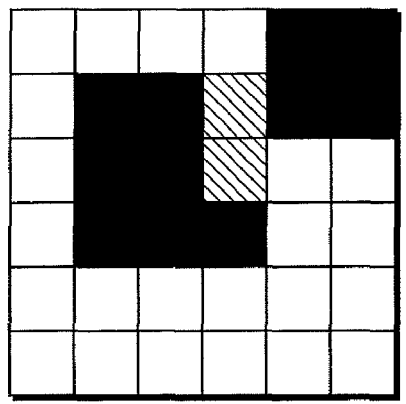
(c) 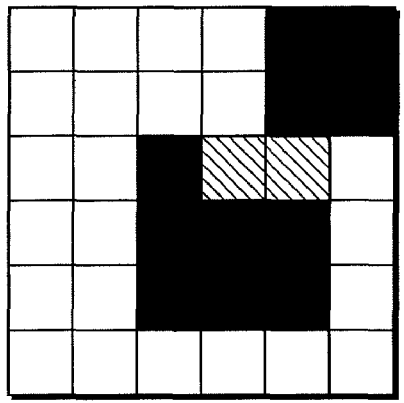
(d) 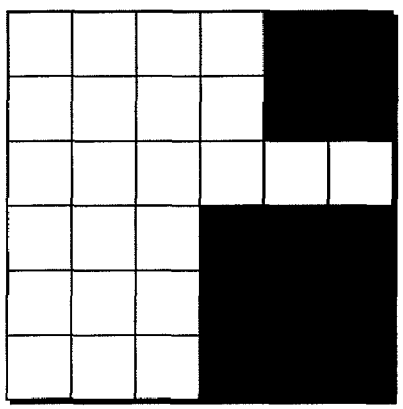

FIG. 16
(a) 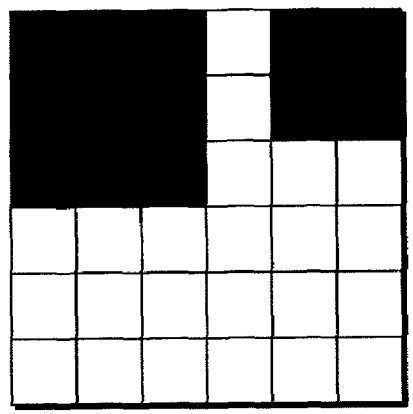
(b) 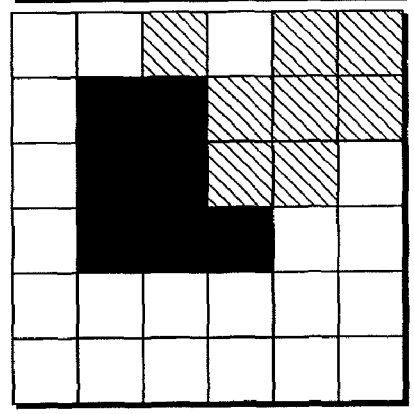
(c) 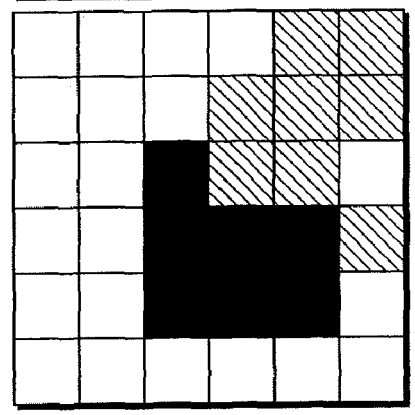
(d) 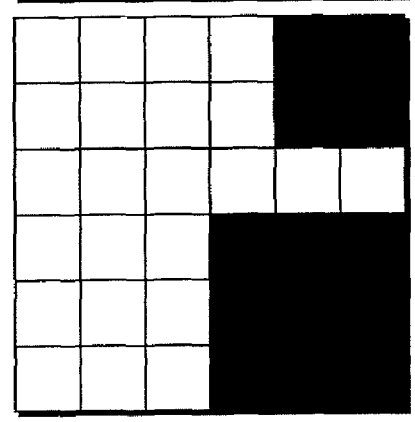

FIG. 19
(a) 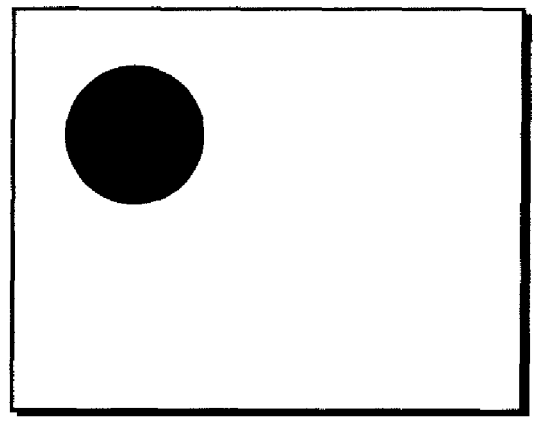
(b) 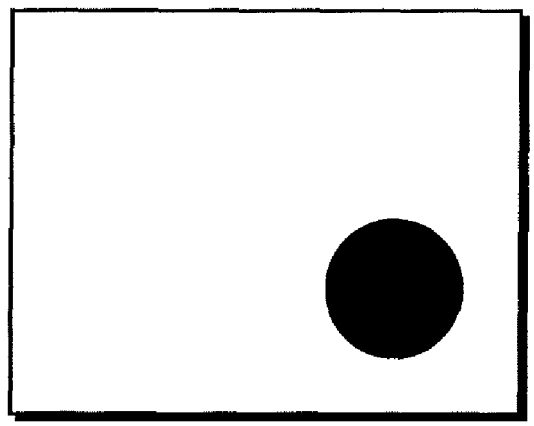

FIG. 20
(a) 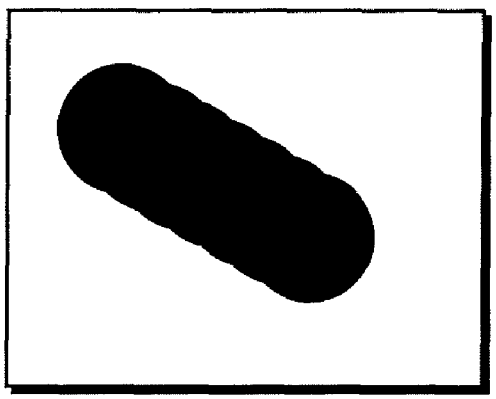
(b) 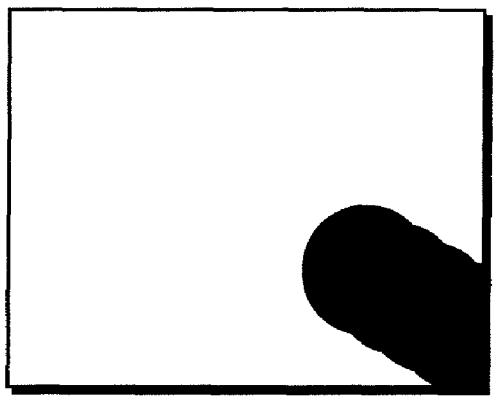

FIG. 23
(a) 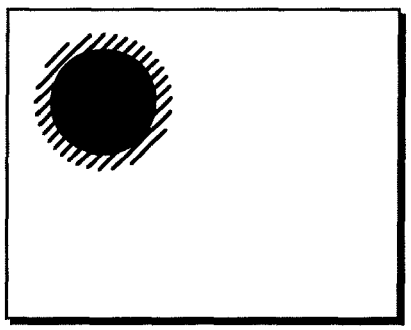
(b) 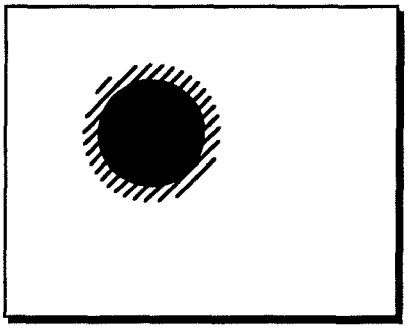
(c) 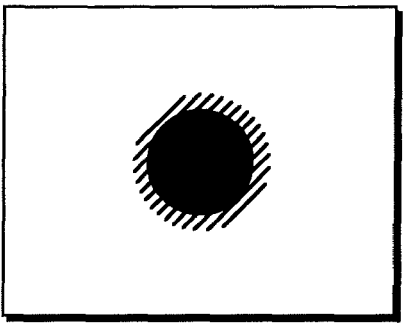
(d) 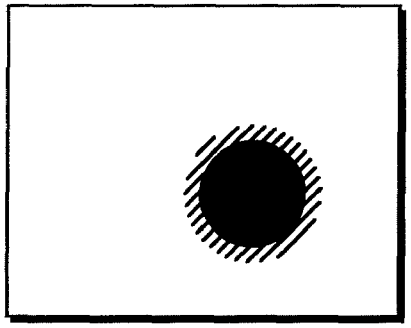
(e) 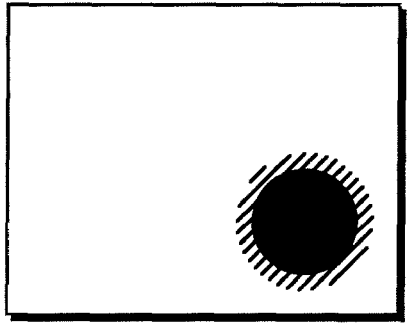

FIG. 24
(a) 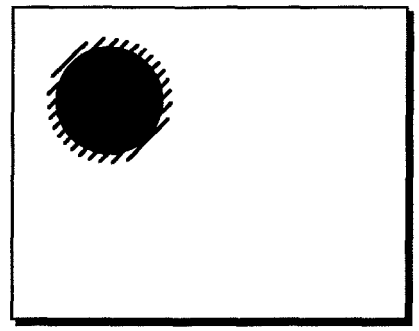
(b) 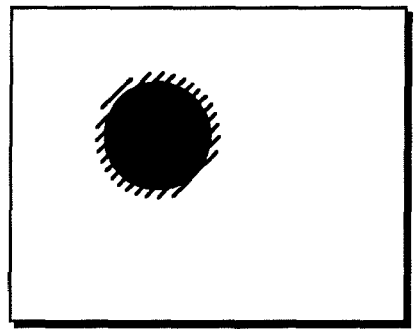
(c) 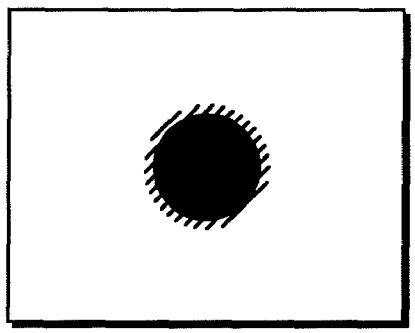
(d) 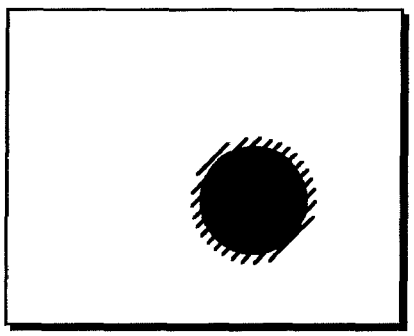
(e) 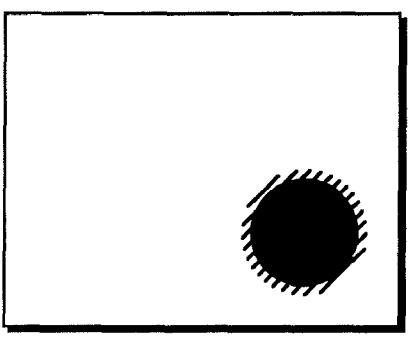

FIG. 27
(a) 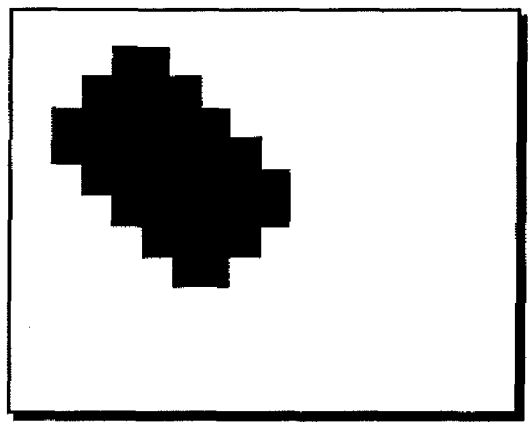
(b) 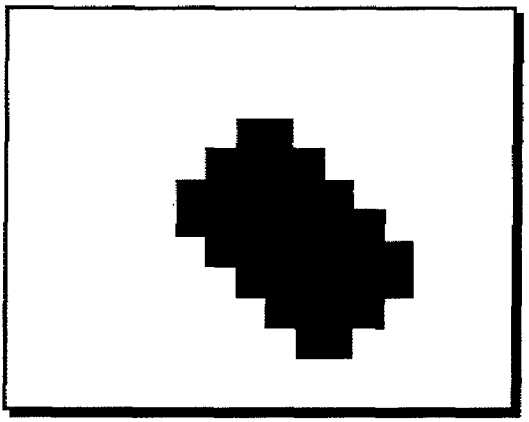
(c) 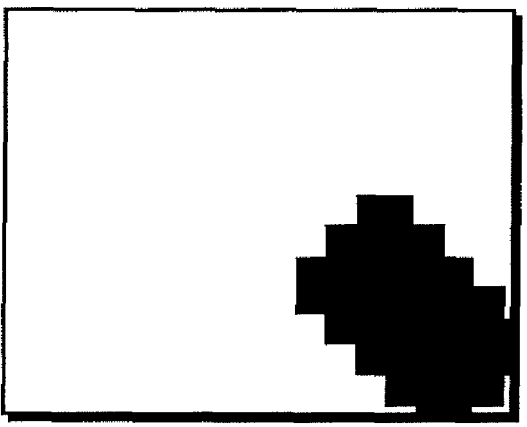

FIG. 29
(a)
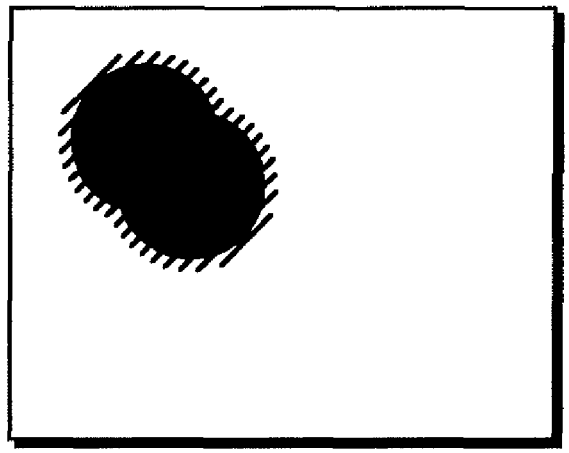
(b)
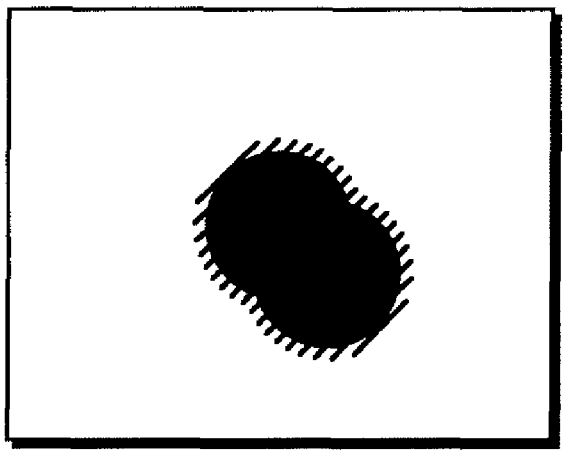
(c)
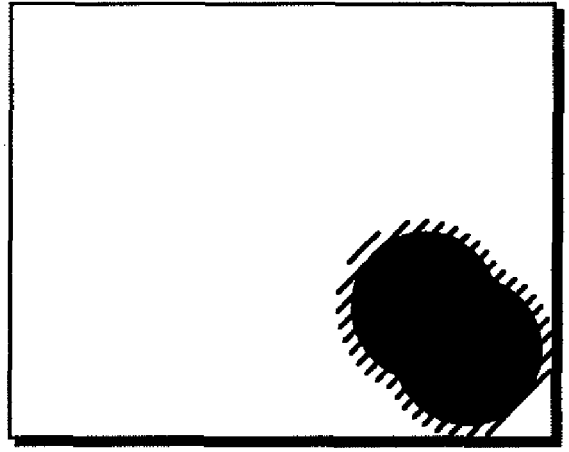

FIG. 30
(a) 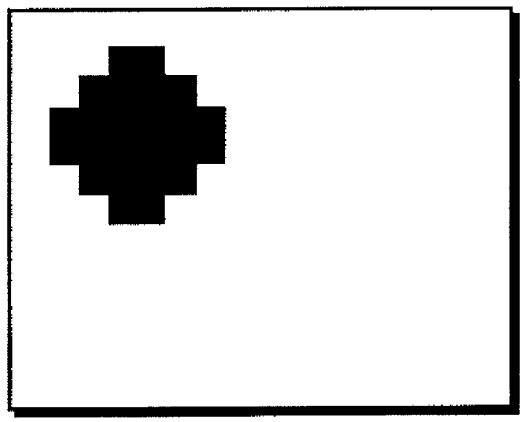
(b) 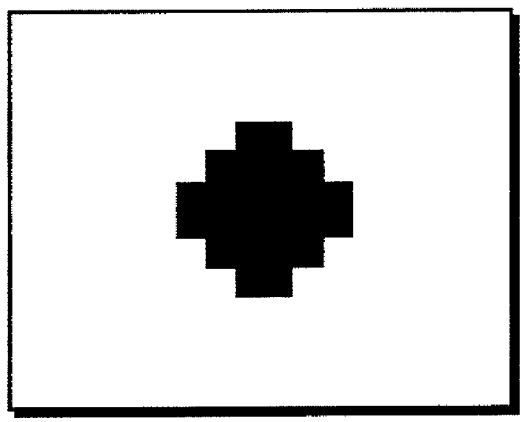
(c) 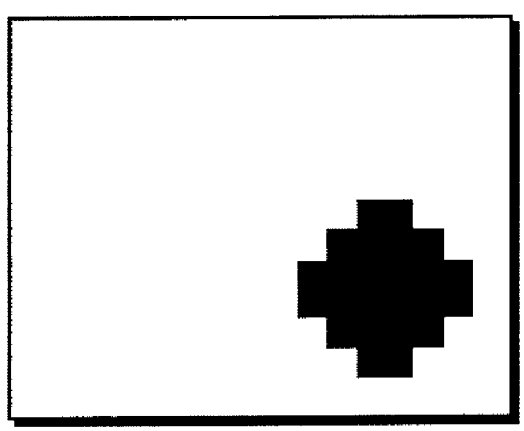

FIG. 32
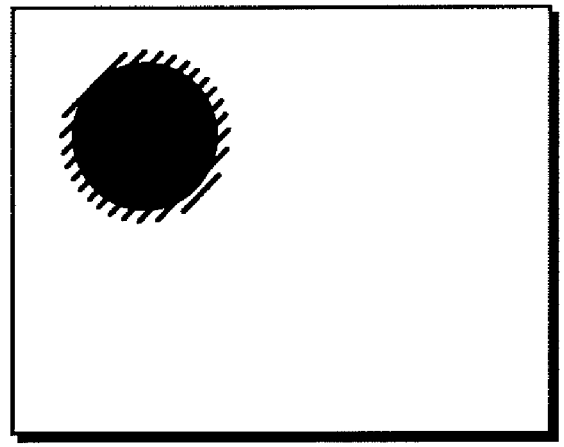
(a)
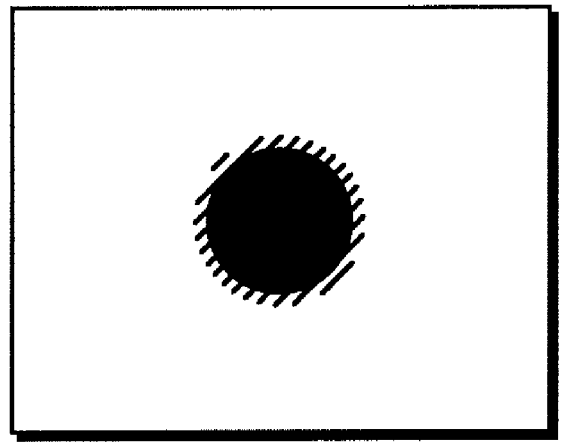
(b)
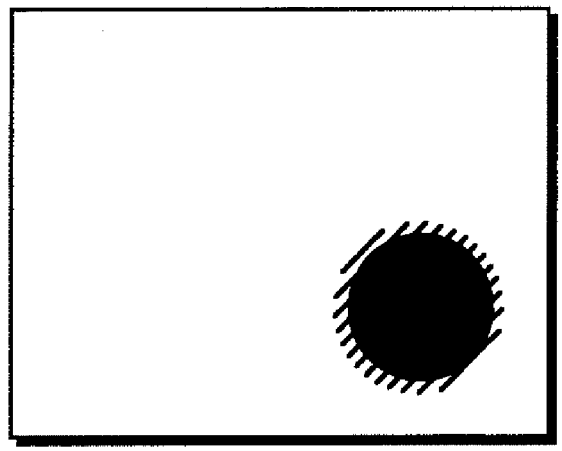
(c)

FIG. 33
(a) Low-Speed and High-Resolution Video Sequence
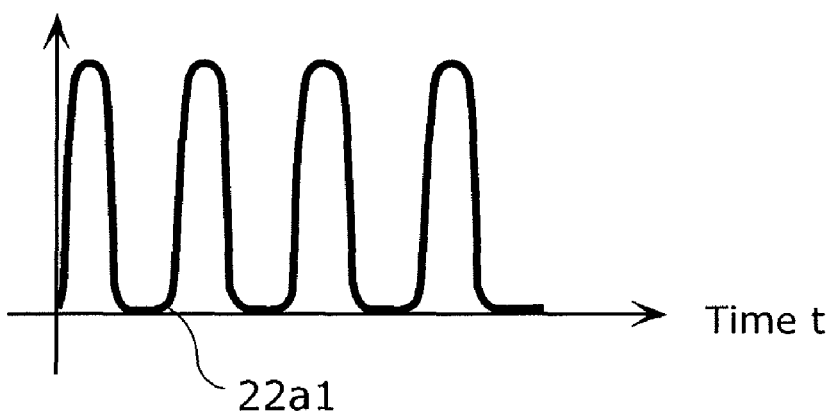
(b) High-Speed and Low-Resolution Video Sequence
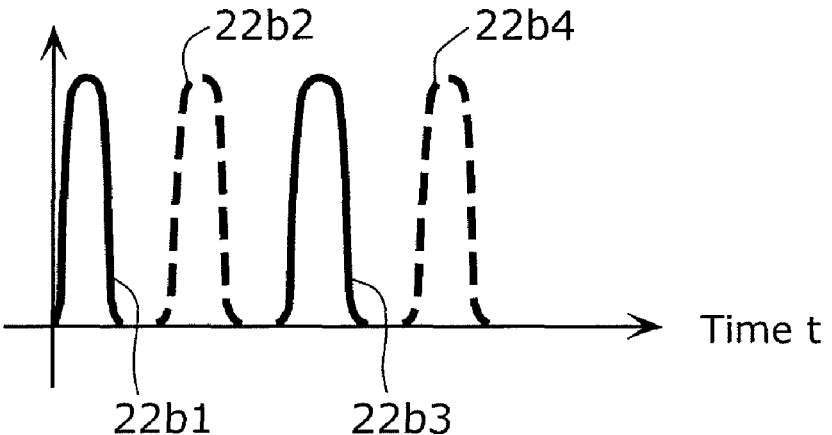

IMAGE GENERATION APPARATUS AND IMAGE GENERATION METHOD FOR GENERATING A NEW VIDEO SEQUENCE FROM A PLURALITY OF VIDEO SEQUENCES

TECHNICAL FIELD

The present invention relates to an image generation apparatus that generates a video sequence, and particularly to an image generation apparatus that generates, from a plurality of video sequences, a new video sequence having all the excellent properties of the plurality of video sequences.

BACKGROUND ART

With the development in digital imaging devices, they have been capable of capturing still images with high spatial resolution at relatively low cost. However, there is a problem to be solved in order to obtain images which move smoothly (for example, at approximately 30 frames per second) while maintaining the high spatial resolution equivalent to such a high spatial resolution of still images, and to further increase image capturing speed.

This is because the speed of transferring image information in an imaging device is not high enough for an enormous amount of image information obtained per unit time, and a special imaging device is needed for transferring a plurality of pieces of image information in parallel, thereby the cost of a photographing apparatus increases or a separate adjustment of the properties of the imaging device is required.

In one of the conventional image generation methods for obtaining images of a high spatial and temporal resolution, morphing is performed based on the detected corresponding points between the frames of a video sequence captured by a high-speed and low-resolution camera and a video sequence captured by a low-speed and high-resolution camera (see, for example, Patent Reference 1). FIG. 1 is a diagram for explaining the conventional image generation method described in the Patent Reference 1. Note that in the specification of the present application, "high speed" (or "low speed") as an imaging capability or a property of a video sequence means a relatively high frame rate (or a relatively low frame rate), and "high resolution" (or "low resolution") means a relatively high spatial resolution (or a relatively low spatial resolution).

In FIG. 1, a high-speed and low-resolution camera A01 and a low-speed and high-resolution camera A02 photograph the same object at the same angle in synchronization with each other. FIG. 2 shows the relationship between the images captured by the camera A01 and the images captured by the camera A02. In FIG. 2, the frames captured by these two cameras A01 and A02 are shown in time order. Frames B01 and B02 are the images captured by the camera A02, while frames B11 to B15 are the images captured by the camera 01. In this diagram, the difference in spatial resolution is represented by the sizes of the images, and the frames B11 to B15 have a smaller number of pixels and thus a lower spatial resolution than that of the frames B01 and B02. On the other hand, since the frame rate of the camera A01 is higher than that of the camera A02, the camera A01 captures four frames while the camera A02 captures one frame. The camera A01 captures the frames in synchronization with the frame capturing by the camera A02 (i.e., the frames B01 and B11 are captured at the same time, and the frames B02 and B15 are captured at the same time). A method for generating a high resolution intermediate frame image which corresponds to the frame B23 in terms of position (and to the frame B13 in terms of capturing time) will be described below as an example.

As for the frame images captured as mentioned above, a primary matching unit A03 calculates the correspondence of pixels between adjacent frames in the video sequence captured by the high-speed camera A01. Here, the correspondence is the relationship between a position of a part of an object represented by each pixel in a frame image and a position of the corresponding pixel in another frame image. Next, by combining the correspondences between respective adjacent high-speed images, the primary matching unit A03 calculates the correspondence between each pixel of the high-speed camera frame B13 located at the time of the frame B23 to be generated and each pixel of the high-speed camera frame B11 captured in synchronization with the low-speed camera frame.

Next, a secondary matching unit A04 combines the positional relationship between the pixels of the low-speed camera frame B01 and the high-speed camera frame B11 captured in synchronization with each other, the positional relationship between the pixels of the frame B13 and the frame B23, and the correspondence between the frame B11 and the frame B13 calculated by the primary matching unit A03, so as to determine the correspondence of the pixels between the frame B01 and the frame B23.

Next, an image generation unit A05 determines the pixel values of the frame B23 using the pixel values of the frame B01 based on the correspondence of the pixels between the frame B01 and the frame B02, so as to generate the high-resolution intermediate frame image B23. The image generation unit A05 generates other intermediate frames in the same manner so as to generate a high-resolution and high-speed video sequence.

The other related documents (Non-Patent Reference 1 and Non-Patent Reference 2, for example) also show the similar methods for generating high-resolution intermediate frame images using a video sequence captured by a high-speed and low-resolution camera and a video sequence captured by a low-speed and high-resolution camera, i.e., by estimating motions between frames of the high-speed video sequence and then morphing the frames of the low-speed and high-resolution video sequence in accordance with the motions.

[Patent Reference 1] Japanese Unexamined Patent Application Publication No. 2003-203237 (FIG. 13)

[Non-Patent Reference 1] Toru MATSUNOBU, et al., "Generation of High Resolution Video Using Morphing", Technical Report of IEICE, PRMU 2004-178

[Non-Patent Reference 2] Kiyotaka WATANABE, et al., "Generation of High Resolution Video Sequence from Two Video Sequences with Different Spatio-temporal Frequencies", Information Technology Letters (FIT 2004), Vol. 3, No. LI-004, 2004

SUMMARY OF THE INVENTION

Problems that Invention is to Solve

However, the above-mentioned conventional art is based on the premise that an accurate correspondence can be obtained between adjacent high-speed frame images and that the accurate motion estimation can be performed, and therefore has a problem that a significantly deteriorated image is generated or a merely enlarged low-resolution image is generated if the accurate correspondence cannot be obtained or the accurate motion estimation cannot be performed. Generally, it is difficult to accurately calculate a correspondence between frames or estimate motions for all the pixels, in the case, for example, where a moving object in a video sequence makes complex motions, an illumination condition changes, occlusion occurs, or an aperture problem occurs.

In view of the above problems, it is an object of the present invention to provide an image generation apparatus and a method therefore which are capable of generating a new video sequence by integrating a plurality of video sequences even if they include image areas in which an accurate correspondence cannot be detected or accurate motion estimation cannot be performed.

Means to Solve the Problems

In accordance with an aspect of the present invention for achieving the above object, an image generation apparatus that generates, from a first video sequence and a second video sequence which are generated by capturing a same object by an external image capturing apparatus, a new video sequence which represents the same object, the image generation apparatus includes: the first video sequence including frames having a first resolution and the second video sequence including frames having a second resolution which is higher than the first resolution, each frame of the first video sequence being generated in a first duration of a first exposure period, and each frame of the second video sequence being generated in a second duration of a second exposure period which is longer than the first duration of the first exposure period an exposure control unit which controls the external image capturing apparatus to temporally change an exposure amount in a part of the second exposure period; an image input unit which receives the first video sequence and the second video sequence from the external image capturing apparatus, the second video sequence being captured under control of the exposure control unit; and an image integration unit which generates, from the first video sequence and the second video sequence received by the image input unit, the new video sequence including frames having a resolution which is equal to or higher than the second resolution, at a frame rate which is equal to or higher than a frame rate of the first video sequence, by reducing a difference between (i) a value of each frame in the second video sequence and (ii) a sum of values of frames in the new video sequence which correspond to the second exposure period for the each frame in the second video sequence.

With this structure, for example, when the image receiving unit receives the low-resolution first video sequence at a high frame rate and the high-resolution second video sequence at a low frame rate, the image integration unit can generate the new video sequence having the same resolution as that of the second video sequence at the same frame rate as that of the first video sequence. In other words, it can generate a new video sequence having all the excellent properties of the inputted plurality of video sequences.

In addition, the exposure control unit temporally changes an exposure amount in a part of an exposure period for the second video sequence (in other words, within an exposure period for the second video sequence). As a result, the image generation apparatus according to the present invention can obtain information having a high temporal frequency, and thereby improve characteristics of high frequency waves of the eventually-generated video sequence.

Note that it is possible to embody the present invention not only as such an image generation apparatus, but also as an image generation method, a program for causing a computer to execute the method, a computer-readable recording medium, such as a CD-ROM, on which the program is recorded, and so forth.

EFFECTS OF THE INVENTION

According to the image generation apparatus of the present invention, it is possible to generate a new video sequence with an improved spatial and temporal resolution even if an original video sequence includes an image area in which an accurate correspondence cannot always be calculated or accurate motion estimation cannot always be performed. For example, it is possible to reliably generate, from a plurality of video sequences, a new video sequence having all the excellent properties of the plurality of video sequences.

BRIEF DESCRIPTION OF DRAWINGS

FIGS. 6($a$) and ($b$) shows an example of inputted images in time order.

FIG. 7($a$) to ($c$) shows specific examples of an image capturing apparatus.

FIG. 9($a$) to ($c$) shows graphs of examples of relationship between the amount of incident light and pixel values used for obtaining modified pixel values.

FIGS. 10($a$) and ($b$) shows the relationship between the result of motion estimation obtained from a high-speed and low-resolution video sequence and a high-speed and high-resolution video sequence.

FIG. 15($a$) to ($d$) shows examples of frame images of a generated video sequence.

FIG. 16($a$) to ($d$) shows examples of frame images of a video sequence generated without using confidence levels.

FIGS. 19($a$) and ($b$) shows examples of frame images of a low-speed and high-resolution video sequence captured with a short exposure period.

FIGS. 20(a) and (b) shows examples of frame images of a low-speed and high-resolution video sequence captured with a long exposure period.

FIG. 23(a) to (e) shows examples of frame images generated with a long exposure period.

FIG. 24(a) to (e) shows examples of frame images generated with a long exposure period.

FIG. 27(a) to (c) shows examples of frame images of a high-speed and low-resolution video sequence.

FIG. 29(a) to (c) shows examples of generated frame images.

FIG. 30(a) to (c) shows examples of frame images of a high-speed and low-resolution video sequence.

FIG. 32(a) to (c) shows examples of generated frame images in the case where an exposure amount is changed.

FIGS. 33(a) and (b) shows temporal changes in an exposure amount within an exposure period for a frame.

NUMERICAL REFERENCES

Figure 1:
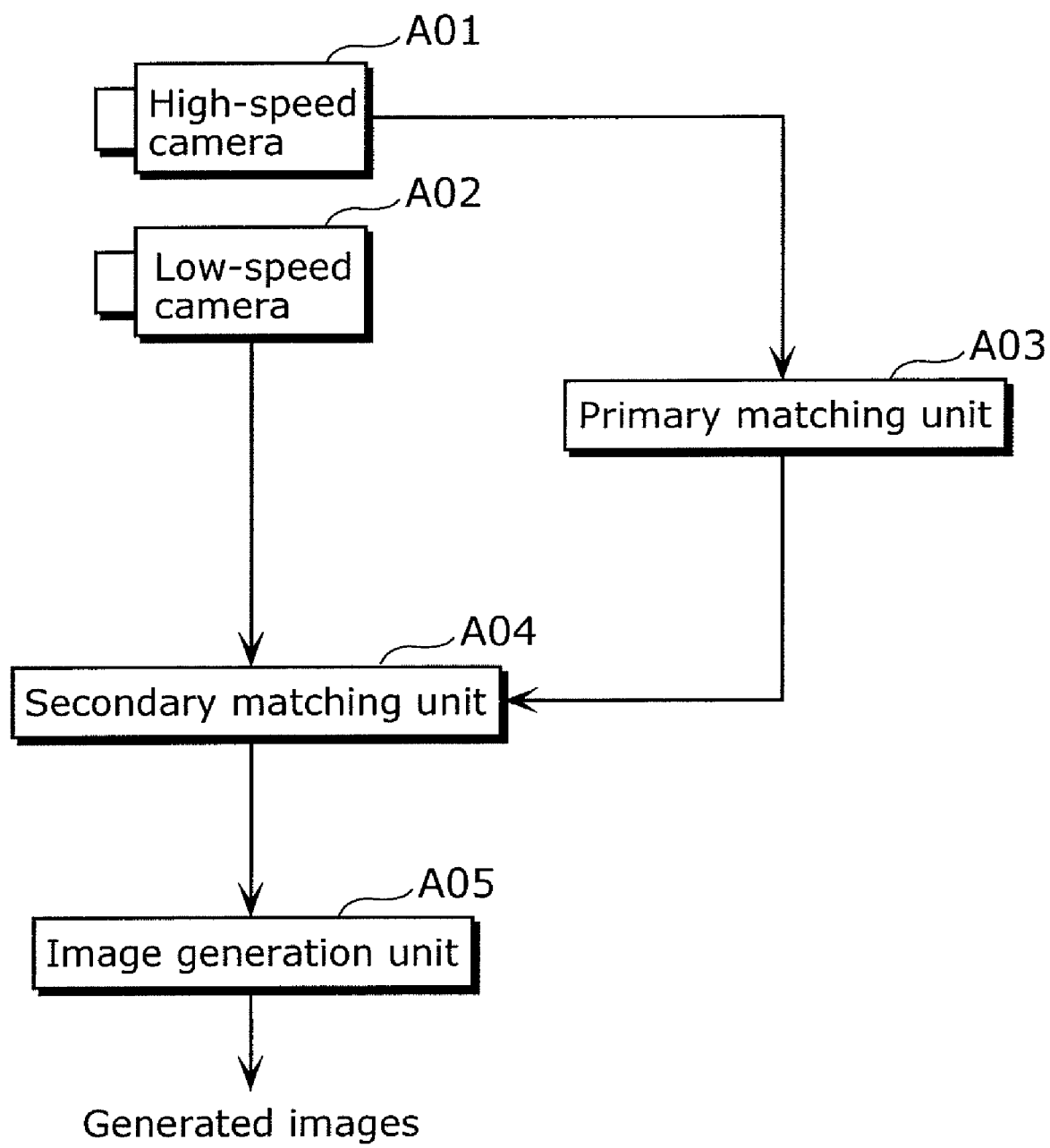
FIG. 1 is a block diagram which shows the structure of a conventional image generation apparatus.
Figure 2:
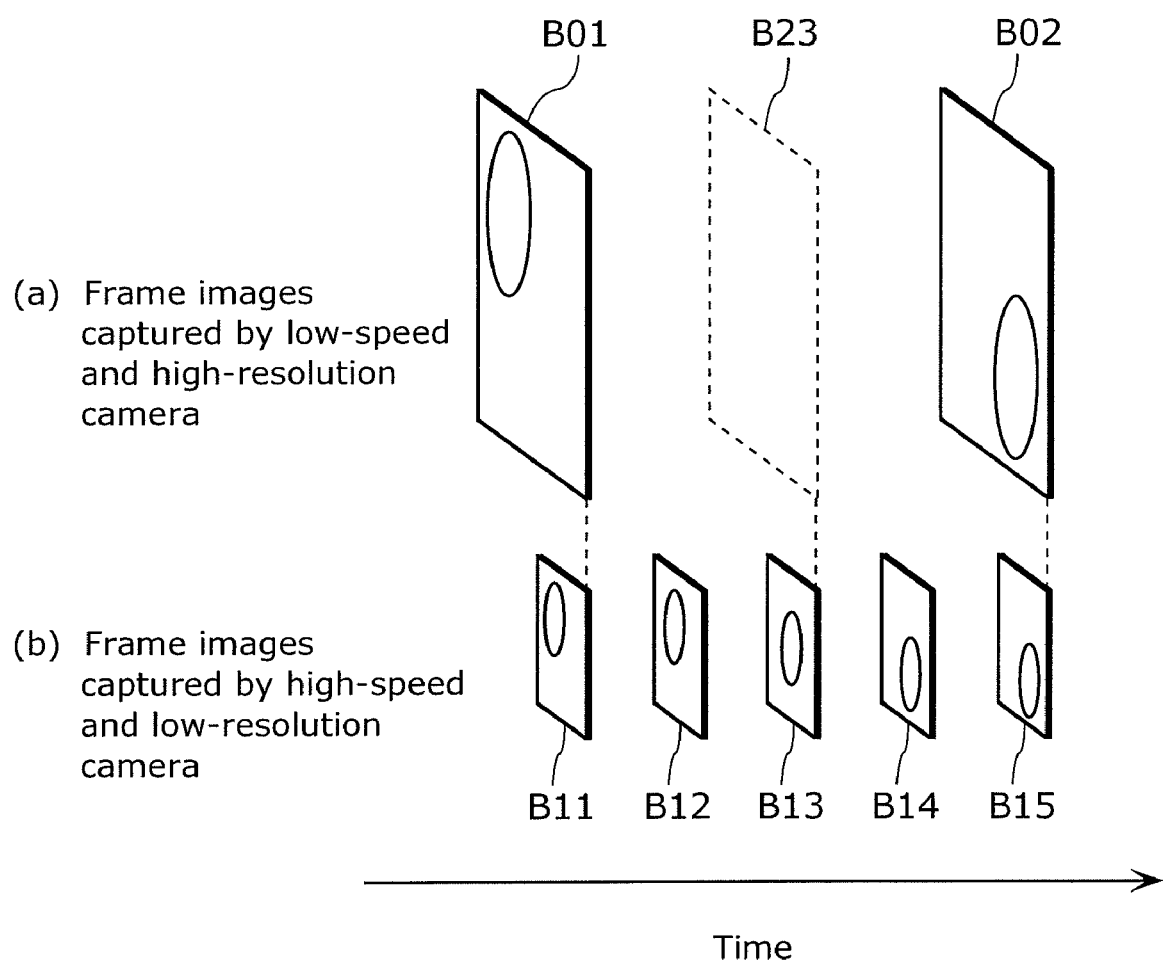
FIGS. 2($a$) and ($b$) shows images inputted in time order to the conventional image generation apparatus.

| | |
|---|---|
| 10 | image capturing apparatus |
| 20 | image storage apparatus |
| 30 | image generation apparatus |
| 40 | display apparatus |
| 100 | image generation system |
| 101 | image receiving unit |
| 101a | high-speed image receiving unit |
| 101b | low-speed image receiving unit |
| 102 | coding unit |
| 103 | motion estimation unit |
| 103a | motion distribution calculation unit |
| 103b | motion confidence level distribution calculation unit |
| 103c | sensor signal receiving unit |
| 104 | image integration unit |
| 104a | integration processing unit |
| 104b | constraint control unit |
| 104c | motion constraint specification unit |
| 104d | external model constraint unit |
| 104e | constraint specification unit |
| 105 | exposure control unit |
| 106a | light-reduction unit |
| 106b | illumination unit |
| 300 | camera |
| 400 | display device |

DETAILED DESCRIPTION OF THE INVENTION

An image generation apparatus according to the present invention generates, from a first video sequence and a second video sequence which are generated by capturing a same object by an external image capturing apparatus, a new video sequence which represents the same object. The image generation apparatus includes: the first video sequence including frames having a first resolution and the second video sequence including frames having a second resolution which is higher than the first resolution, each frame of the first video sequence being generated in a first duration of a first exposure period, and each frame of the second video sequence being generated in a second duration of a second exposure period which is longer than the first duration of the first exposure period an exposure control unit which controls the external image capturing apparatus to temporally change an exposure amount in a part of the second exposure period; an image input unit which receives the first video sequence and the second video sequence from the external image capturing apparatus, the second video sequence being captured under control of the exposure control unit; and an image integration unit which generates, from the first video sequence and the second video sequence received by the image input unit, the new video sequence including frames having a resolution which is equal to or higher than the second resolution, at a frame rate which is equal to or higher than a frame rate of the first video sequence, by reducing a difference between (i) a value of each frame in the second video sequence and (ii) a sum of values of frames in the new video sequence which correspond to the second exposure period for the each frame in the second video sequence.

Here, the exposure control unit may control the external image capturing apparatus to set a non-exposure period at least once within the second exposure period, in the non-exposure period the exposure amount being reduced. The exposure control unit may control the external image capturing apparatus to reduce an exposure amount for the frame in the first video sequence in a part of the first exposure period, in synchronization with the non-exposure period for the second video sequence. Furthermore, the exposure control unit may control the external image capturing apparatus to change the exposure amount for the frame in the second video sequence in a part of the second exposure period, in synchronization with the first exposure period for the frame in the first video sequence which is included in the second exposure period for the frame in the second video sequence.

With the structure, both of (i) information having a high temporal frequency included in the first video sequence resulting from a short duration of an exposure period and (ii) information having a high special frequency included in the second video sequence resulting from a high resolution are reflected in the frames in the new video sequence. Thereby, the image generation apparatus according to the present invention can generate the new video sequence having an excellent spatial and temporal resolution. By temporally changing the exposure amount within the exposure period of each frame of the second video sequence, the second video sequence has information having a higher temporal frequency. As a result, a temporal resolution of the new video sequence is improved.

Still further, the external image capturing apparatus may include a light-reduction unit which reduces an amount of incident light from the same object, by an amount under control of the exposure control unit, when the second video sequence is generated, and the exposure control unit controls the external image capturing apparatus to change the exposure amount by controlling the light-reduction unit.

Still further, the external image capturing apparatus may include an illumination unit which illuminates the same object, with an intensity under control of the exposure control unit, when the second video sequence is generated, and the exposure control unit controls the external image capturing apparatus to change the exposure amount by controlling the illumination unit.

EMBODIMENT

An image generation system according to the preferred embodiment of the present invention will be described in detail with reference to the diagrams.

Figure 3:
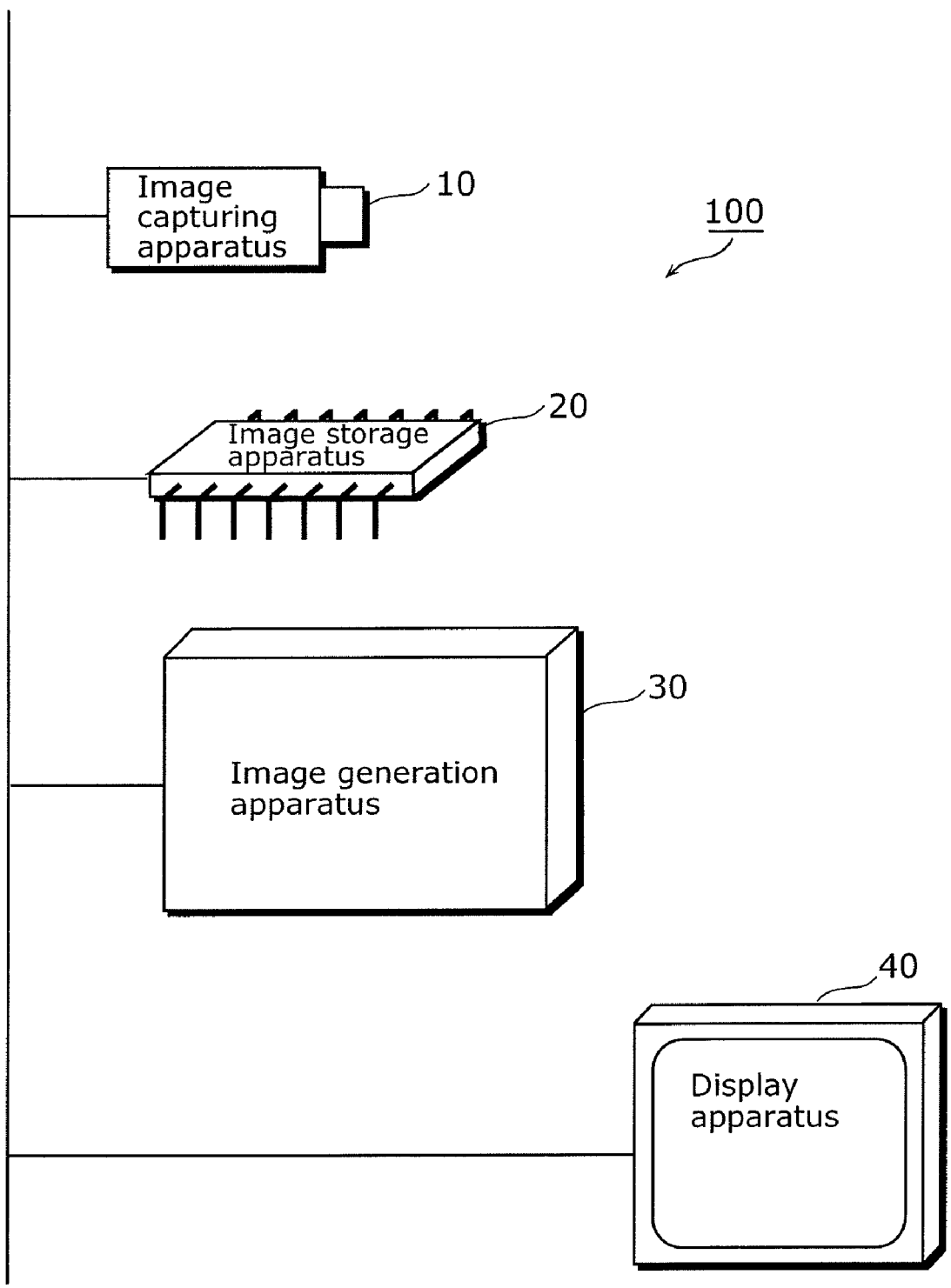
FIG. 3 is a block diagram which shows the hardware structure of the image generation system according to an embodiment of the present invention.

FIG. 3 is a block diagram which shows the hardware structure of the image generation system according to the present embodiment of the present invention.

An image generation system 100 is a system for generating a new high spatial and temporal resolution video sequence (a high-speed and high-resolution video sequence in this example) from a plurality of video sequences (a high-speed and low-resolution video sequence and a low-speed and high-resolution video sequence) showing the same object. This system includes an image capturing apparatus 10, an image storage apparatus 20, an image generation apparatus 30 and a display apparatus 40. The image capturing apparatus 10 is a camera or the like which photographs an object so as to capture two types of video sequences of different spatial and temporal resolutions (a high-speed and low-resolution video sequence and a low-speed and high-resolution video sequence). The image storage apparatus 20 is a memory or the like which temporarily stores the video sequences captured by the image capturing apparatus 10. The image generation apparatus 30 is an apparatus which reads a plurality of video sequences stored in the image storage apparatus 20 and generates a new video sequence with an increased spatial and temporal resolution from the read plurality of video sequences. The display apparatus 40 is an apparatus which displays the new video sequence generated by the image generation apparatus 30. Note that the image generation apparatus 30 may be embodied as hardware such as a dedicated circuit, or as software such as an image processing program for a general-purpose computer.

Figure 4:
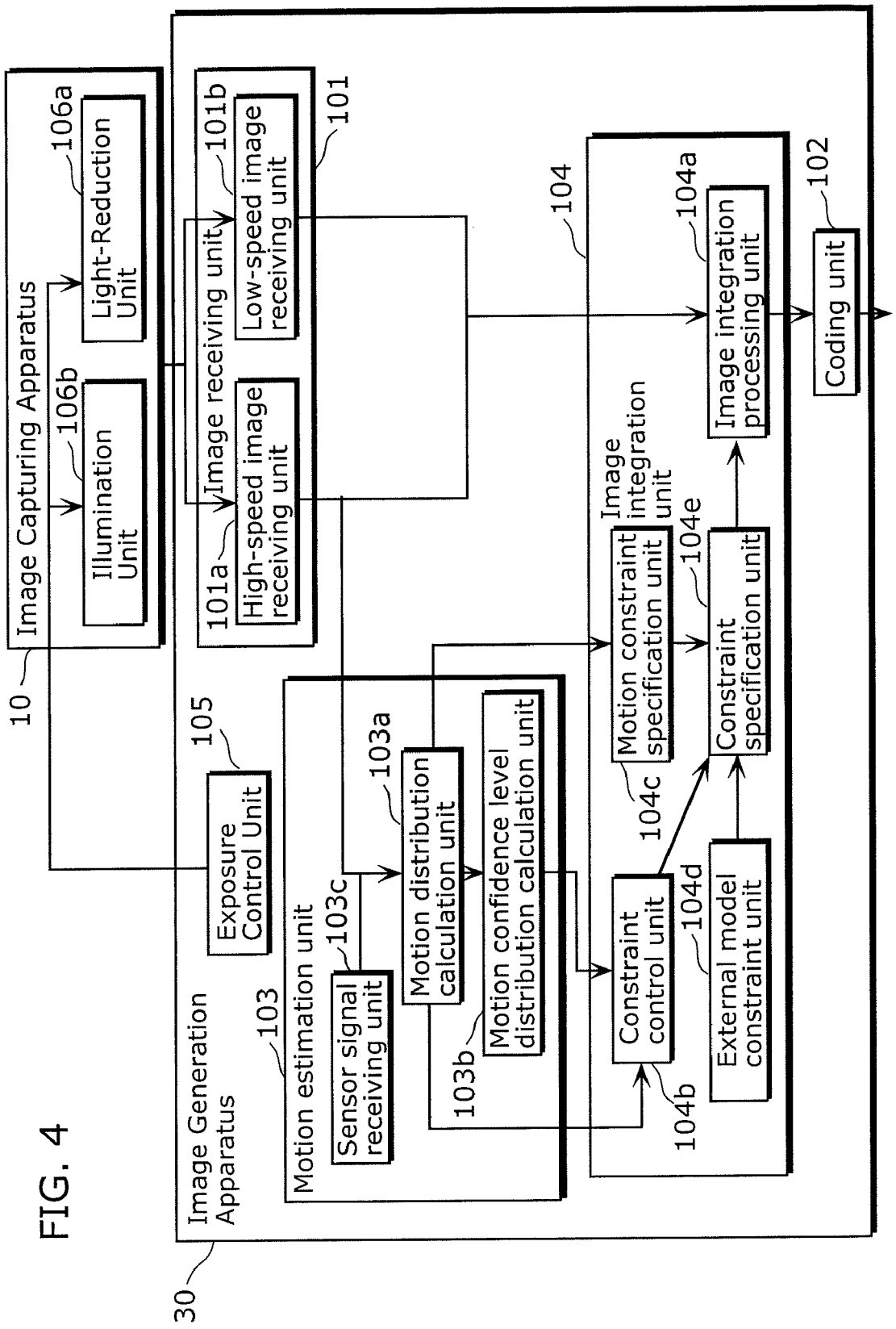
FIG. 4 is a functional block diagram which shows the structure of the image generation apparatus.

FIG. 4 is a functional block diagram which shows the internal structures of the image capturing apparatus 10 and the image generation apparatus 30 in the image generation system 100 shown in FIG. 3.

The image capturing apparatus 10 includes a light-reduction unit 106a and a illumination unit 106b.

The light-reduction unit 106a reduces an amount of incident light from an object which is captured, by an temporally-changeable amount under the control of the image generation apparatus 30. An example of the light-reduction unit 106 is an electrically-controllable filter or shutter which is arranged in an optical system (not shown) introducing the incident light to imaging elements. The illumination unit 106b illuminates the object by a temporally-changeable light amount, under the control of the image generation apparatus 30.

This image generation apparatus 30 includes an image receiving unit 101, a motion estimation unit 103, an image integration unit 104, and the exposure control unit 105.

The exposure control unit 105 controls at least one of the light-reduction unit 106a and the illumination unit 106b, to temporally change an exposure amount in a part of an exposure period for each frame in a low-speed and high-resolution video sequence which is captured by the image capturing apparatus 10.

The image receiving unit 101 is an interface or the like which accepts inputted plurality of video sequences of different spatial and temporal resolutions or different spatial and temporal phases obtained by photographing the same object. The image receiving unit 101 includes a high-speed image receiving unit 101a which accepts (or acquires) an inputted video sequence (a high-speed and low-resolution video sequence) captured at a high speed (high frame rate) and with a low spatial resolution, and a low-speed image receiving unit 101b which accepts (or acquires) an inputted video sequence (a low-speed and high-resolution video sequence) captured at a low speed (low frame rate) and with a high spatial resolution of the same object. As mentioned above, both the image inputted to the high-speed image receiving unit 101a and the image inputted to the low-speed image receiving unit 101b are the images obtained by photographing the same object, although they are different in their spatial and temporal resolutions. Here, it should be noted that an exposure amount in an exposure period for each frame in a low-speed and high-resolution video sequence can be changed temporally by the light-reduction unit 106a or the illumination unit 106b.

The motion estimation unit 103 includes: a sensor signal receiving unit 103c which acquires a signal from a motion estimation sensor in the image capturing apparatus 10 which generates images to be inputted to the image receiving unit 101 (such as an acceleration sensor included in the image capturing apparatus 10); a motion distribution calculation unit 103a which performs motion estimation of an object across the entire inputted image of each frame, based on at least one of the image inputted to the image receiving unit 101 and the motion signal inputted to the sensor signal receiving unit 103c; and a motion confidence level distribution calculation unit 103b which calculates the confidence level of motion estimation performed across the entire image of each frame by the motion distribution calculation unit 103a.

The image integration unit 104 is a processing unit which generates a new video sequence by integrating a plurality of video sequences, using the result of motion estimation performed by the motion estimation unit 103 for an image area with a high confidence level out of the plurality of video sequences inputted to the image receiving unit 101, while using predetermined constraints for an image area with a low confidence level out of the plurality of video sequences. The image integration unit 104 includes an integration processing unit 104a, a constraint control unit 104b, a motion constraint specification unit 104c, an external model constraint unit 104d, and a constraint specification unit 104e.

The motion constraint specification unit 104c is a processing unit which specifies, using the result of motion estimation performed by the motion distribution calculation unit 103a, the constraints (the constraints specified depending on the result of motion estimation are hereinafter referred as "motion constraints") which should be satisfied by each pixel value of a high-speed and high-resolution video sequence to be generated.

The external model constraint unit 104d specifies the constraints (the constraints specified independent of the result of motion estimation are hereinafter referred to as "external model constraints"), in addition to the result of motion estimation performed by the motion distribution calculation unit 103a, which should be satisfied by each pixel value of a high-speed and high-resolution video sequence to be generated.

The constraint control unit 104b determines, using the result of motion estimation calculated by the motion distribution calculation unit 103a and the confidence level calculated by the motion confidence level distribution calculation unit 103b, the degrees of motion constraints and external model constraints to be imposed respectively in each position in each frame image in a high-speed and high-resolution video sequence to be generated. The constraint control unit 104b also notifies the constraint specification unit 104e of the determined degrees.

The constraint specification unit 104e specifies, based on the degrees of the motion constraints and external model constrains to be imposed determined by the constraint control unit 104b, the constraints obtained by integrating the motion constraints specified by the motion constraint specification unit 104b and the external model constraints specified by the external model constraint unit 104d. That is, the constraints which should be satisfied by each pixel value of the high-speed and high-resolution video sequence to be generated.

The integration processing unit 104a integrates the high-speed video sequence inputted to the high-speed image receiving unit 101a and the low-speed video sequence inputted to the low-speed image receiving unit 101b according to the constraints specified by the constraint specification unit 104e, so as to generate a high-speed and high-resolution video sequence.

The coding unit 102 compresses and encodes the video sequence generated by the integration processing unit 104a and outputs the resulting data.

Note that "frames" in the present embodiment include not only frames in progressive scan but also even fields and odd fields in interlaced scan.

Figure 5:
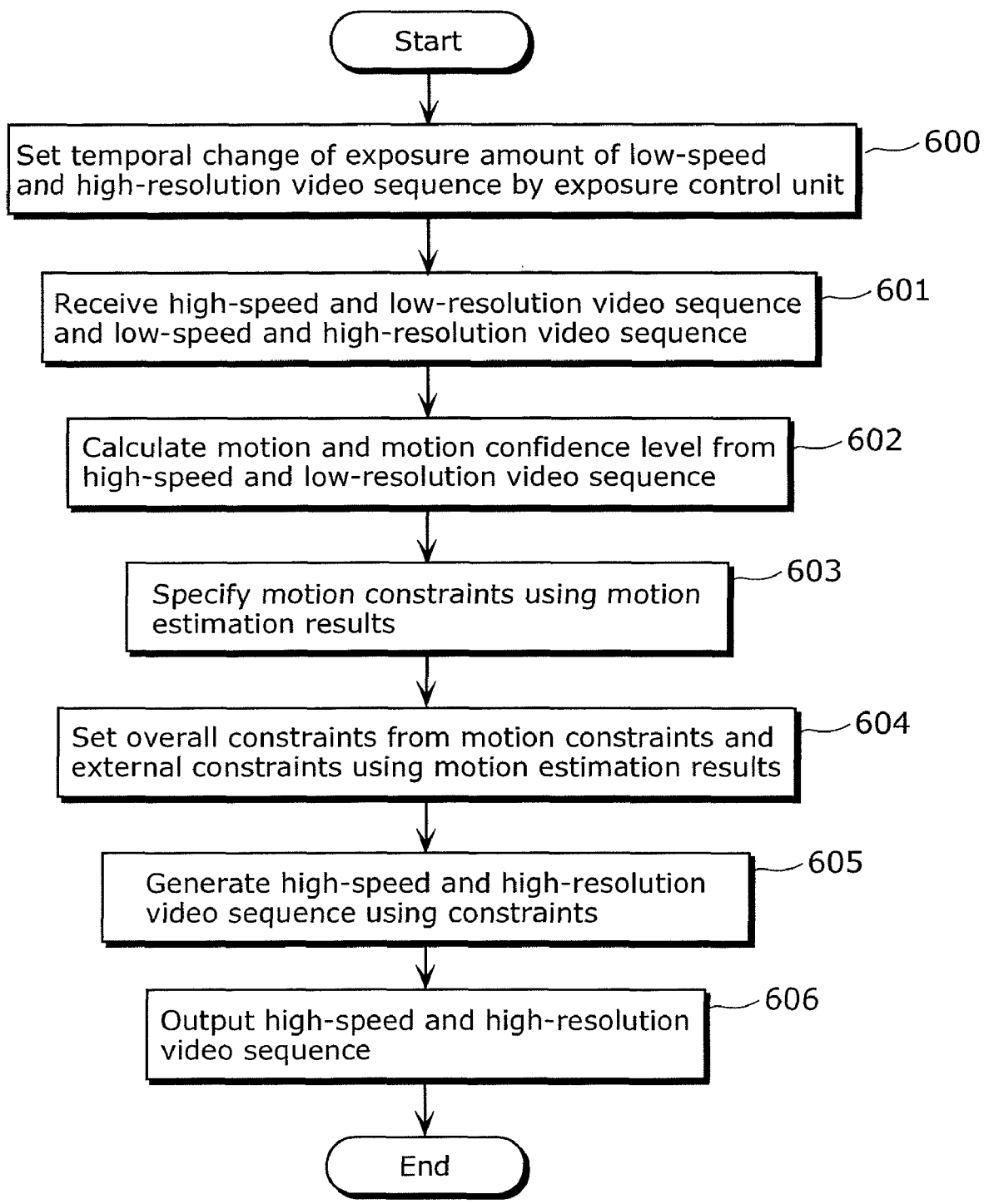
FIG. 5 is a flowchart which shows the operations of the image generation apparatus.

Next, the processes executed by the image generation apparatus 30 structured as mentioned above will be described below. FIG. 5 is a flowchart of the processes executed by the image generation apparatus 30. FIG. 5 is a flowchart of the processes executed by the image generation apparatus 30.

In Step 600, the exposure control unit 105 sets how to temporally change an exposure amount within an exposure period for each frame in a low-speed and high-resolution video sequence. The following explanation is given for the case where an exposure amount is set to be constant in an exposure period. The case where an exposure amount is temporally changed within an exposure period is explained further below.

The exposure control unit 105 controls the image capturing apparatus 10 to set an exposure amount to be constant in an exposure period. Under the control of the exposure control unit 105, the image capturing apparatus 10 captures a high-speed and low-resolution video sequence and a low-speed and high-resolution video sequence of the same object.

In Step 601, the high-speed image receiving unit 101a accepts the input of the high-speed and low-resolution video sequence, while the low-speed image receiving unit 101b accepts the input of the low-speed and high-resolution video sequence of the same object. In the following description, a luminance image is used as an image.

FIGS. 6(*a*) and (*b*) shows the relationship between a high-speed and low-resolution video sequence inputted to the high-speed image receiving unit 101a and a low-speed and high-resolution video sequence inputted to the low-speed image receiving unit 101b. In FIGS. 6(*a*) and (*b*), the successive frame images in these two video sequences are arranged in time order. Frames 201 and 202 represent low-speed and high-resolution images, while frames 211 to 215 represent high-speed and low-resolution images.

In this diagram, the difference in spatial resolution is represented by the difference in image size. The frames 211 to 215 each has a smaller number of pixels and a less spatial resolution than those of the frames 201 and 202. On the other hand, as for the frame rate, the high-speed image receiving unit 101a captures images at a higher frame rate than the low-speed image receiving unit 101b. In this example, the high-speed image receiving unit 101a captures four frames while the low-speed image receiving unit 101b captures one frame. The time length between the frames 201 and 202 represents an exposure period. The images inputted to the low-speed image receiving unit 101b are captured at a lower frame rate but can be exposed for a longer time than the images inputted to the high-speed image receiving unit 101a. In FIG. 6(*a*), the frame 201 in the low-speed and high-resolution video sequence is exposed for a time period which is equivalent to a time period for capturing four frames in the high-speed and low-resolution video sequence.

The image of the frame inputted to the high-speed image receiving unit 101a and the image of the frame inputted to the low-speed image receiving unit 101b do not always need to be captured at the same time, if the relative relationship between these imaging timings is previously known (in other words, the phases at these imaging timings may be different from each other). In addition, longer exposure allows acquisition of motion information such as an afterimage of a moving object even in a high-resolution video sequence. It is possible to generate a video sequence with a high spatial and temporal resolution by generating a video sequence which is consistent with motion information obtained from high-resolution images in an image integration process to be described later.

A specific example of the image capturing apparatus 10, namely, a photographing unit which captures two types of images will be shown below. These two types of images may be captured by arranging two types of cameras having different characteristics, using a half mirror, so that their angles of view become identical, as shown in FIG. 7(*a*), or they may be captured by arranging two types of imaging elements having different characteristics within a camera, using a half mirror or a prism, so that their angles of view become identical, as shown in FIG. 7(*b*), or they may be captured using an imaging element which captures simultaneously two types of images having different properties, as shown in FIG. 7(*c*).

Figure 8:
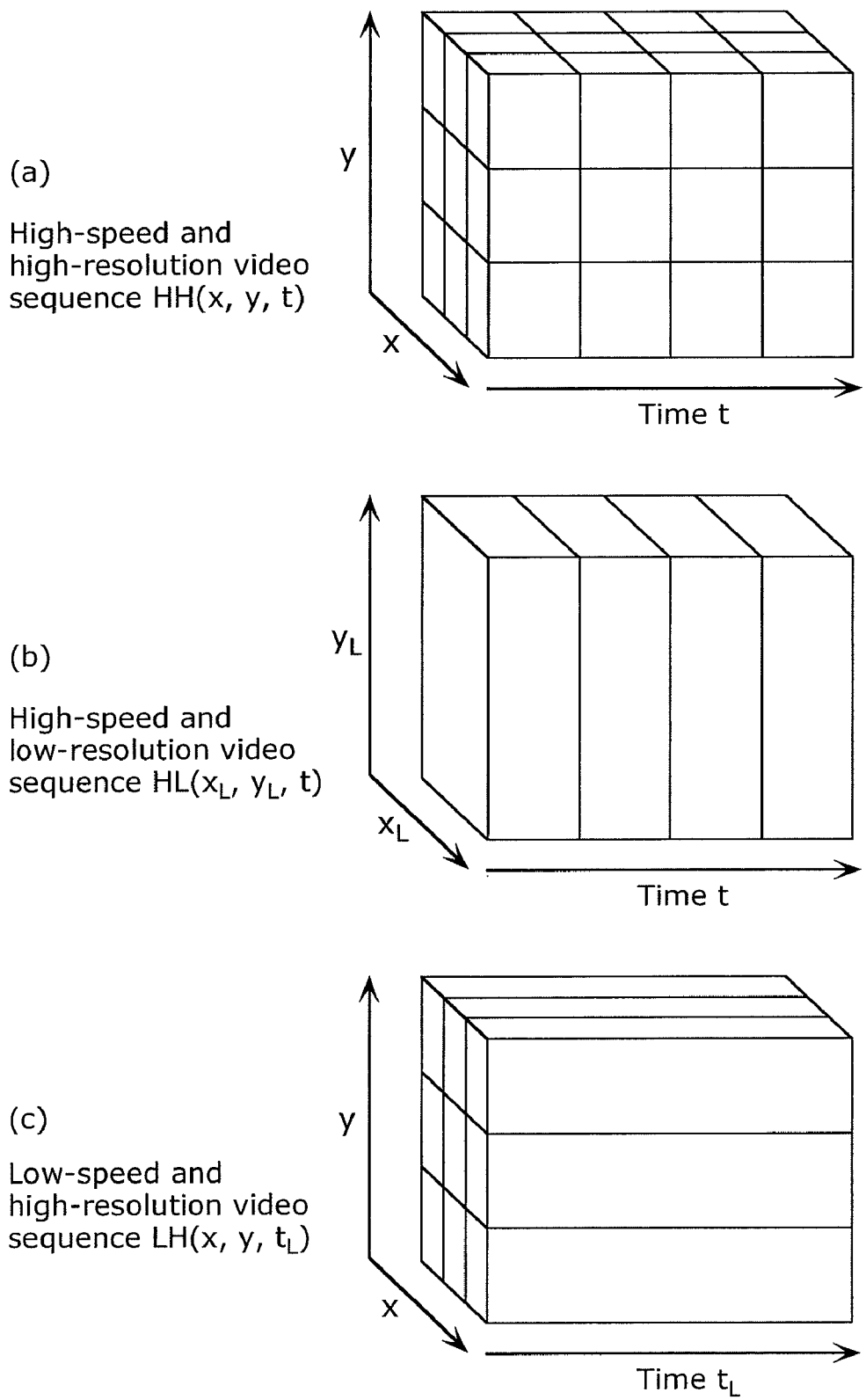
FIG. 8($a$) to ($c$) shows examples of pixel arrangements of a generated high-speed and high-resolution video sequence, an inputted high-speed and low-resolution video sequence, and an inputted low-speed and high-resolution video sequence, respectively.

Next, a description will be given below, with reference to FIG. 8(*a*) to (*c*), of the relationship between the pixel values (luminance values) of a target high-speed and high-resolution video sequence and the pixel values (luminance values) of a high-speed and low-resolution video sequence received by the high-speed image receiving unit 101a and a low-speed and high-resolution video sequence received by the low-speed image receiving unit 101b. This relationship is used for image generation as an external model constraint which should be satisfied by each pixel of the high-speed and high-resolution video sequence to be generated.

It is assumed here that the pixel values of each image are proportional to the amount of incident light when the image is captured, and the common proportional constant is used for all the pixel values. FIG. 8(*a*) shows an arrangement of pixels of each frame in a target high-speed and high-resolution video sequence. For convenience of explanation, a part of the high-speed and high-resolution video sequence is extracted. FIG. 8(*a*) shows an arrangement of pixels of each frame in a target high-speed and high-resolution video sequence. For convenience of explanation, a part of the high-speed and high-resolution video sequence is extracted. FIG. 8(a) shows an arrangement of vertical three pixels (in the y-axis direction) and horizontal three pixels (in the x-axis direction) in four successive frames. The value of a pixel located at the pixel position (x, y, t) shall be HH(x, y, t). Here, x and y are the values within a range of 0, 1 and 2, while the value of t is within a range of 0, 1, 2 and 3.

Similarly, FIG. 8(b) shows an arrangement of pixels in a high-speed and low-resolution video sequence captured at the same time and at the same angle of view as those of the high-speed and high-resolution video sequence shown in FIG. 8(a). Here, the value of a pixel located at the pixel position (xL, yL, t) in the high-speed and low-resolution video sequence is represented as HL(xL, yL, t). Since a low-resolution image and a high-resolution image are different in their numbers of pixels in the x direction and the y direction, the x and y coordinate values of the low-resolution image are respectively represented as $x_L$ and $y_L$ so as to be distinguished from those of the high-resolution image. In this example, an image area of nine pixels (three pixels in the x direction and three pixels in the y direction) in the high-resolution image is equivalent to an image area of one pixel in the low-resolution image, and the relationship of pixel values are represented by the following Equation 1.

$$HL(x_L, y_L, t) = \sum_{x=0}^{2}\sum_{y=0}^{2} HH(x, y, t) \qquad \text{[Equation 1]}$$

Similarly, FIG. 8(c) shows an arrangement of pixels of a low-speed and high-resolution video sequence captured at the same time and the same angle of view as those of the video sequence shown in FIG. 8(a). Here, the pixel value of a pixel located at the pixel position (x, y, $t_L$) in the low-speed and high-resolution video sequence is represented as LH(x, y, $t_L$).

Since a low-resolution image and a high-resolution image are different in their numbers of frames in the time direction, the frame number of the low-speed image is represented as $t_L$ so as to be distinguished from that of the high-resolution image. In this example, a time interval of four frames in the high-speed image is equivalent to a time interval of one frame in the low-speed image, and the relationship of the pixel values are represented by the following Equation 2.

$$LH(x, y, t_L) = \sum_{t=0}^{3} G(t) * HH(x, y, t) \qquad \text{[Equation 2]}$$

Here, G(t) represents an image capturing intensity at a time t, and indicates a scaling factor of a pixel value which changes according to the temporal change in the sensitivity of an imaging element and the aperture used for image capture. When there is no temporal change in the sensitivity of the imaging element and the aperture used for image capture, G(t) is 1.0. When there is no temporal change in an exposure amount by the exposure control unit, G(t) is 1.0.

Note that in the above example, the time t is represented in a discrete manner, but the relational expression as the following Equation 3 is used when the change in images are associated with temporally continuous change. It is possible to represent the process of deterioration in temporally continuous sequence of inputs by substituting $HH_{cont}$(x, y, $t_{cont}$) in Equation 3 for HH(x, y, t) in Equations 1 and 2.

$$LH(x, y, t) = \int_{t}^{t+\Delta t} \text{Exp}(t_{cont}) \cdot HH_{cont}(x, y, t_{cont}) dt_{cont} \qquad \text{[Equation 3]}$$

In Equation 3, Δt indicates a virtual exposure period of a frame image of a high-speed and high-resolution video sequence to be generated, $t_{cont}$ indicates a continuous time, $HH_{cont}$(x, y, $t_{cont}$) indicates temporally successive sequence of images, and Exp($t_{cont}$) indicates a change in the virtual exposure period of the frame image of the high-speed and high-resolution video sequence.

By making the exposure period of low-speed images longer than that of high-speed images, as shown in FIGS. 6(a) and (b), it becomes possible to accumulate afterimage information for a long period of time, thereby producing an effect that a high-speed and high-resolution video sequence can be generated with a spatial and temporal resolution being increased even in a part thereof in which motion occurs.

The above description has been given, taking, as an example, the case where pixel values are proportional to an amount of incident light (FIG. 9(a)). However, in the case where they are not proportional because of γ correction or the like (FIG. 9(b)) and the case where the proportional constant varies from pixel to pixel, it is possible to modify the pixel values so that they have the common proportional constant to the incident light so as to satisfy Equations 1 and 2. This is done by inversely associating the pixel values with the input-output characteristics (input-output relationship) of an imaging element determined by capturing separately provided images. For example, by modifying the pixel values obtained as shown in FIG. 9(b) using the correspondence between the pixel values and the modified values as shown in FIG. 9(c), it is possible to process the modified pixel values in the same manner as the pixel values obtained as shown in FIG. 9(a).

The above description has been given using luminance values as pixel values. However, even if each pixel has the values of colors R, G and B, the same relationship as the luminance values can be obtained for respective values of R, G and B.

Other external model constraints include continuity and smoothness between the values of spatially and temporally adjacent pixels. When the continuity of pixel values is used, the sum of squares Qs of the differences in luminance values of adjacent pixels in a high-speed and high-resolution video sequence is considered as shown in the following Equation 4.

$$Qs = \lambda s(x, y, t) \cdot \begin{bmatrix} \sum_{x=1}^{x_{max}} \left\{ \begin{matrix} HH(x, y, t) - \\ HH(x-1, y, t) \end{matrix} \right\}^2 + \\ \sum_{y=1}^{y_{max}} \left\{ \begin{matrix} HH(x, y, t) - \\ HH(x, y-1, t) \end{matrix} \right\}^2 + \\ \sum_{t=1}^{t_{max}} \left\{ \begin{matrix} HH(x, y, t) - \\ HH(x, y, t-1) \end{matrix} \right\}^2 \end{bmatrix} \qquad \text{[Equation 4]}$$

When the smoothness of pixel values is used, the sum of squares Qs of the second order differences in luminance values of adjacent pixels in a high-speed and high-resolution video sequence is considered as shown in the following Equation 5.

$$Qs = \lambda s(x, y, t) \cdot \begin{bmatrix} \sum_{x=1}^{x_{max}-1} \left\{ \begin{array}{c} 2 \cdot HH(x, y, t) - \\ HH(x+1, y, t) - \\ HH(x-1, y, t) \end{array} \right\}^2 + \\ \sum_{y=1}^{y_{max}-1} \left\{ \begin{array}{c} 2 \cdot HH(x, y, t) - \\ HH(x, y+1, t) - \\ HH(x, y-1, t) \end{array} \right\}^2 + \\ \sum_{t=1}^{t_{max}-1} \left\{ \begin{array}{c} 2 \cdot HH(x, y, t) - \\ HH(x, y, t+1) - \\ HH(x, y, t-1) \end{array} \right\}^2 \end{bmatrix}$$ [Equation 5]

In Equations 4 and 5, $x_{max}$, $y_{max}$ and $t_{max}$ indicate an x-direction pixel number, a y-direction pixel number and a maximum frame number, respectively. $\lambda s(x, y, t)$ is a coefficient for specifying the spatial and temporal distribution of constraints, and is determined using a motion confidence level in Step 604 to be described later.

As mentioned above, an external model constraint can be represented as an evaluation function for a high-speed and high-resolution video sequence to be generated. A decrease in the value of the evaluation function (evaluation value) is equivalent to an addition of the above-mentioned external model constraint to the high-speed and high-resolution video sequence.

Spatially and temporally continuity of edges can be used as one of the other external model constraints. For example, a constraint, as shown by the following Equation 6, that a change in the direction of an edge is small between the corresponding positions in temporally adjacent frames can be used. A constraint, as shown by the following Equation 7, that edges facing the same direction exist in a spatially successive manner can be used.

$$Qte = \lambda te(x, y, t) \cdot$$ [Equation 6]
$$\sum_{x=0}^{x_{max}} \sum_{y=0}^{y_{max}} \sum_{t=0}^{t_{max}} \sum_{i=0}^{i_{max}} \left\{ edge\left( \begin{array}{c} x+u(x,y,t), y+ \\ v(x,y,t), t+1, i \end{array} \right) - \atop edge(x, y, t, i) \right\}^2$$

$$Qse = \lambda se(x, y, t) \cdot$$ [Equation 7]
$$\sum_{x=0}^{x_{max}} \sum_{y=0}^{y_{max}} \sum_{t=0}^{t_{max}} \sum_{i=0}^{i_{max}} \left\{ edge(x+i_x, y+i_y, t, i) - \atop edge(x, y, t, i) \right\}^2$$

In Equations 6 and 7, edge(x, y, t, i) indicates the strength of an edge of the i-th direction located at the position (x, y, t) in a video sequence. "i" indicates the type of an edge direction and has an integral value within a range from 0 to $i_{max}$. $(i_x, i_y)$ in Equation 7 indicates a vector representing the direction indicated by the i-th edge direction.

u(x, y, t) and v(x, y, t) indicate an x-direction component and a y-direction component of a motion vector at the position (x, y, t) in an image. Edge detection can be achieved using the output from an edge detection filter such as a Gabor filter having direction dependence or using an edge direction which is discretized, when necessary, after the edge direction and strength are obtained by a differential operation as shown in the following Equation 8.

$$\left( \frac{\partial HH(x, y, t)}{\partial x}, \frac{\partial HH(x, y, t)}{\partial y} \right)$$ [Equation 8]

Equation 8 represents the edge direction and strength at the coordinate (x, y, t) of a high-speed and high-resolution video sequence HH, as a two-dimensional vector. The direction of the vector corresponds to the edge direction, and the magnitude of the vector corresponds to the edge strength.

In the above Equations, as with $\lambda s(x, y, t)$, $\lambda te(x, y, t)$ and $\lambda se(x, y, t)$ are also coefficients for specifying the spatial and temporal distribution of a constraint, and are determined using a motion confidence level in Step 604 to be described later.

As one of the other constraints, a limitation to principal components in a group of video sequences, which predetermine acceptable limits of images which can be represented by a video sequence to be generated, may be performed. For example, assuming that the luminance value HH(x, y, t) of each pixel in each frame of a video sequence is an independent element and the video sequence is a single data point, principal component analysis is performed on a group of video sequences each having the same predetermined number of frames and predetermined number of pixels, so as to generate a video sequence using the principal components preferentially. In this case, when the vector of a non-principal component is NPC(x, y, t), the inner product of the non-principal component (NPC) and a video sequence HH(x, y, t) to be generated is a constraint. This constraint Qpc is represented by the following Equation 9.

$$Qpc = \lambda pc(x, y, t) \cdot \sum_{x=0}^{x_{max}} \sum_{y=0}^{y_{max}} \sum_{t=0}^{t_{max}} NPC(x, y, t) \cdot HH(x, y, t)$$ [Equation 9]

NPC is not limited to only one. A plurality of NPCs may be used, or the type of NPCs may be switched depending on an inputted image. In this case, the relationship between the inputted image and the principal component of a high-resolution image is previously learned and an NPC is selected using this learning result. For example, three different types of groups of high-speed and high-resolution video sequences 1, 2 and 3 are prepared for learning. Vectors of non-principal components NPC1, NPC2 and NPC3 are obtained respectively from these groups of video sequences. Separately from the vectors, high-speed and low-resolution video sequences HL1, HL2 and HL3 and high-speed and high-resolution video sequences HH1, HH2 and HH3 are obtained respectively from the above groups of video sequences 1, 2 and 3 using Equations 1 and 2.

The relationship to be learned here is the correspondences between the three types of non-principal components NPC1, NPC2 and NPC3 and the three groups of video sequences: video sequences HL1 and HH1; video sequences HL2 and HH2; and video sequences HL3 and HH3. These correspondences may be learned using an arbitrary method. For example, a pair of average images of a high-speed and low-resolution video sequence HL and a high-speed and high-resolution video sequence HH is obtained for each group of video sequences and the correspondence between the pair of average images and the type of the non-principal component is retained (learning).

The difference between each pair of average images and a pair of new inputted video sequences HL and HH is obtained, and the non-principal component corresponding to the pair of average images having the smallest difference is used for the processing for reconstructing the inputted video sequences.

A method other than retention of the relationship between the average images and the type of non-principal components may be used. For example, it is acceptable to obtain in advance the input-output relationship using a learning method such as a neural network where the input is a pair of a high-speed and low-resolution video sequence HL and a high-speed and high-resolution video sequence HH and the output is the types of non-principal components corresponding to these HL and HH; to input the pair of input video sequences HL and HH to the neural network after the learning; and to use, as a constraint, the non-principal component of the type obtained as the output from the neural network.

In Equation 9, as with $\lambda s(x, y, t)$, $\lambda pc(x, y, t)$ is also a coefficient for specifying the spatial and temporal distribution of a constraint, and is determined using a motion confidence level in Step 604 to be described later.

Next, in Step 602, the motion estimation unit 103 calculates a motion and the confidence level of the motion from a high-speed and low-resolution video sequence. Here, the motion distribution calculation unit 103*a* obtains the direction and magnitude of the motion of an object (motion estimation) at each position in each frame of a video sequence received from the high-speed image receiving unit 101*a*, so as to calculate the spatial and temporal distribution of the directions and magnitudes of the motions.

The motion confidence level distribution calculation unit 103*b* calculates the spatial and temporal distribution conf(x, y, t) of the confidence levels of motion estimation. In this case, the confidence level of motion estimation indicates that the certainty of a motion estimation result increases as the confidence level increases and that the lower confidence level implies an error in the motion estimation result.

A motion between the corresponding positions in images of adjacent two frames can be obtained by, for example, a method used in P. ANANDAN, "A Computational Framework and an Algorithm for the Measurement of Visual Motion", IJCV, 2,283-310 (1989) (Non-Patent Reference 3), a motion estimation technique generally used for video coding, and a feature point tracking technique used for tracking a moving object in an image sequence.

It is also acceptable to perform motion estimation for each of a plurality of areas using a common technique of global motion (such as affine motion) estimation across the image, a technique shown in Lihi Zelkik-Manor, "Multi-body Segmentation: Revisiting Motion consistency", ECCV (2002) (Non-Patent Reference 4), or the like, so as to determine the motion as a motion at each pixel position.

A confidence level can be calculated by a method described in the above document written by the Non-Patent Reference 3. In the case of motion estimation using block matching, it is acceptable to use, as a confidence level, the value obtained by subtracting the sum of squares of differences in pixel values between blocks corresponding to each other through a motion from the maximum possible value $SSD_{max}$ of the sum of squares, as shown in Equation 10, namely, Conf(x, y, t) which is the negative value of the sum of squares of differences in pixel values between the blocks. Either when global motion estimation in an image is used or when local motion estimation in each area of an image is used, it is acceptable to use, as a confidence level, the value Conf(x, y, t) obtained by subtracting the sum of squares of differences in respective pixel values between an area adjacent to the starting point of a motion and an area adjacent to the ending point of the motion, from the maximum possible value $SSD_{max}$ of the sum of squares.

$$Conf(x, y, t) = SSD_{max} - \sum_{i \subset block} \sum_{j \subset block} \{I(x+i, y+j, t) - I(x'+i, y'+j, t+1)\}^2 \quad \text{[Equation 10]}$$

In Equation 10, the position (x', y', t+1) is a pixel position which is equivalent to the destination of a motion from the pixel position (x, y, t) obtained as a result of motion estimation. In Equation 10, $\Sigma$ indicates an addition within a block area to be used for block matching.

Note that although in the above description, motion estimation and confidence level calculation are performed using images obtained from the high-speed image receiving unit 101*a*, such motion estimation and confidence level calculation may be performed using images obtained from the low-speed image receiving unit 101*b*.

Information from a sensor (a signal inputted to the sensor signal receiving unit 103*c*) which detects a change in attitude of a photographing device may be used as an input. In this case, if the image capturing apparatus 10 includes an acceleration sensor and an angular acceleration sensor and the sensor signal receiving unit 103*c* obtains the speed and angular speed as an integration value of the acceleration, the motion distribution calculation unit 103*a* can obtain, based on the information inputted to the sensor signal receiving unit 103*c*, information of motion across the entire image produced by a change in the camera attitude such as motion blur.

For example, when a camera including vertical and horizontal angular acceleration sensors is used as the image receiving unit 101, it is possible to obtain, based on the outputs from the sensors, vertical and horizontal accelerations as a measured value of the attitude at each time. By integrating the acceleration values over time, it is possible to calculate an angular speed at each time.

When a camera has a horizontal angular speed $\omega h$ and a vertical angular speed $\omega v$ at a time t, the angular speed of the camera can be uniquely associated with the two-dimensional motion (u, v) of the object image originating from the camera direction, at the time t and at the position (x, y) on an imaging element (a captured image).

The correspondence between the angular speed of the camera and the motion of the object image can be generally determined based on the characteristics (such as a focal length and lens distortion) of the optical system (such as a lens) in the camera, as well as the arrangement and the pixel pitch of the imaging element. The actual value of the correspondence can be calculated geometrically and optically from the characteristics of the optical system, the arrangement and the pixel pitch of the imaging element, or by referring to the speed (u, v) of the object image on the imaging element (x, y) obtained from the angular speeds $\omega h$ and $\omega h$ in the correspondences previously held as a table.

Motion information obtained using such a sensor can be used together with the result of motion estimation obtained from an image. In this case, the motion distribution calculation unit 103*a* uses the information from the sensor mainly for motion estimation across the image, while using the result of motion estimation obtained from the image mainly for motion of an object in the image.

Next, in Step 603, the motion constraint specification unit 104*c* specifies the relationship between the result of motion estimation obtained by the motion estimation unit 103 and the target high-speed and high-resolution video sequence. The relationship between the result of motion estimation obtained from low-resolution images and a high-speed and high-resolution video sequence is described with reference to FIGS. 10(a) and (b).

In FIGS. 10, (a) and (b) respectively show high-speed frame images (frame numbers t and t+1) which are adjacent to each other. For ease of explanation, an area of three pixels by three pixels in a low-resolution image will be described as an example. Here, each pixel of a high-resolution image area is obtained by dividing a pixel of a low-resolution image area into nine (3×3) pieces. FIGS. 10(a) and (b) shows only the pixels of the high-resolution image, which is necessary for explanation.

It is assumed here that, as a result of motion estimation performed by the motion estimation unit 103, the position of a low-resolution image pixel enclosed by a thick line 501 in FIG. 10(a) corresponds to the pixel position 502 in FIG. 10(b) (i.e., the image area 501 moves to the image area 502). Using the above-mentioned motion estimation technique, it is generally possible to calculate the direction and magnitude of motion on the basis of a smaller unit than a pixel.

Therefore, it is possible to calculate a motion of each pixel of a high-resolution image which differs in position from the position of a low-resolution image pixel, as shown in FIG. 10(b), so as to obtain the relationship as shown in the following Equation 11.

It is assumed that the following relationship is obtained for the value of each pixel within the areas 501 and 502 in an image of a high-speed and high-resolution video sequence, using this result of motion estimation.

$$HH(x,y,t)=HH(x+u(x,y,t),y+v(x,y,t),t+1)$$ [Equation 11]

Here, u(x, y, t) and v(x, y, t) represent the results of motion estimation. Specifically, u(x, y, t) and v(x, y, t) indicate an amount of motion in the x direction and an amount of motion in the y direction, respectively, in the motion from the position (x, y, t) within the area 501 in FIG. 10(a) to the area 502 in FIG. 10(b). In the above example, motion estimation is performed on a high-speed and low-resolution video sequence, but motion estimation can be performed on a low-speed and high-resolution video sequence so as to use the result thereof. When a high-resolution video sequence is used, the time interval between the frames increases. However, the positional accuracy in associating pixels between frames to be used for motion estimation improves.

Next, in Step 604, the constraint control unit 104b determines the spatial and temporal distribution of the strength of a constraint, and the constraint specification unit 104e specifies an overall constraint to be imposed on a high-speed and high-resolution video sequence to be generated. More specifically, the constraint specification unit 104e specifies an overall constraint J(HH) to a target high-speed and high-resolution video sequence, using the respective relationships, as shown in Equations 1 and 2, between an image in a high-speed and high-resolution video sequence and a high-speed image and a low-speed image; the relationship, as shown in Equation 11, between the result of motion estimation and a high-speed and high-resolution video sequence; and the external model constraints as shown in Equations 4, 5, 6, 7, 9 and others. The following Equation 12 shows an example of an overall constraint J.

$$J=|HL-HL'|^2+|LH-LH'|^2+Qs+Qm+Qse+Qte+Qpc$$ [Equation 12]

In Equation 12, the first term of the right side is a constraint indicating the difference (the sum of squares of the differences between the corresponding pixels) between a high-speed and low-resolution video sequence HL' created from a high-speed and high-resolution video sequence using Equation 1 and a high-speed and low-resolution video sequence HL which is actually inputted to the high-speed image receiving unit 101a. The second term is a constraint indicating the difference (the sum of squares of the differences between the corresponding pixels) between a low-speed and high-resolution video sequence LH' created from a high-speed and high-resolution video sequence and a low-speed and high-resolution video sequence LH which is actually inputted to the low-speed image receiving unit 101b. The constraint in the first term and the constraint in the second term are used so that the relationship of luminance values between a generated image and a captured image satisfies the relationships shown in Equations 1 and 2 as much as possible. In other words, these constraints are the conditions for avoiding inconsistency in luminance values between the generated image and the captured image as much as possible.

The third term of the right side of Equation 12 represents an external model constraint Qs. When the constraints shown in Equations 4 and 5 are used, this constraint Qs helps spatially and temporally adjacent pixels in a generated image have similar luminance values. Therefore, this constraint suppresses generation of an image of which luminance values spatially and temporally change little by little like noise. The fourth term of the right side of Equation 12 represents a constraint Qm obtained based on a motion estimation result. The following Equation 13 shows an example of a constraint obtained based on a motion estimation result so as to help to avoid inconsistency between the motion estimation result and a generated image.

$$Q_m = \sum_{x=0}^{x_{max}-1} \sum_{y=0}^{y_{max}-1} \sum_{t=0}^{t_{max}-1} \lambda_m(x, y, t) \cdot \{HH(x + u(x, y, t), y + v(x, y, t), t + 1) - HH(x, y, t)\}^2$$ [Equation 13]

In Equation 13, a constraint is created using the motions u and v between adjacent frames t and t+1 in a high-speed and high-resolution video sequence. However, a constraint may be created using a motion estimation results u' and v' between frames separated from each other by one or more frames, as shown in the following Equation 14. Both the constraints shown in Equations 13 and 14 may be used.

$$Q_m = \sum_{x=0}^{x_{max}-2} \sum_{y=0}^{y_{max}-2} \sum_{t=0}^{t_{max}-2} \lambda_m(x, y, t) \cdot \{HH(x + u'(x, y, t), y + v'(x, y, t), t + 2) - HH(x, y, t)\}^2$$ [Equation 14]

Using motion estimation performed in different frame intervals, it is possible to estimate a motion which is hard to estimate in a small number of frame intervals, such as a slow motion, and to reflect the estimated motion to image generation.

The fifth term of the right side of Equation 12 represents a constraint indicating temporal continuity of edges, the sixth term of the right hand of Equation 12 represents a constraint indicating spatial continuity of edges, and the seventh term of the right side of Equation 12 represents a constraint for suppressing non-principal components in a generated image.

Here, $\lambda s$, $\lambda m$, $\lambda se$, $\lambda te$ and $\lambda pc$ are coefficients for determining a spatial and temporal distribution of strengths of constraints, and are determined by the constraint control unit 104b. It is assumed that the confidence level of motion estimation calculated by the motion confidence level distribution calculation unit 103b in Step 602 is conf(x, y, t)(>0), and the confidence level of motion estimation increases as this value increases.

For example, $\lambda s$, $\lambda m$, $\lambda se$, $\lambda te$ and $\lambda pc$ are determined as follows: when conf(x, y, t)>$\alpha$ is satisfied where $\alpha$ is a predetermined constant, a motion constraint is imposed by setting, for example, $\lambda m$(x, y, t)=1.0, other constraints are set to small values $\omega$(>1.0) which are predetermined on a coordinate (x, y, t), and when conf(x, y, t)<=$\alpha$, $\lambda m$(x, y, t)=0.0 is set and other $\lambda$ values are set to 1.0. More specifically, when the motion estimation unit 103 performs motion estimation on the basis of a block obtained by dividing each image in a video sequence, the confidence level of motion estimation conf(x, y, t) is calculated by subtracting the sum of squares of differences in pixel values between blocks from the maximum possible value of the sum of squares thereof. Using, as a high-confidence image area, a block having the difference greater than a predetermined value $\alpha$, the image integration unit 104 generates a new image for the high-confidence image area using the motion estimation result. On the other hand, using, as a low-confidence image area, a block having the difference smaller than or equal to the predetermined value $\alpha$, the image integration unit 104 generates a new image for the low-confidence image area using external model constraints.

$\lambda$ may be determined in another manner. For example, it may be defined successively using a monotonically increasing function g(x), where $\lambda m$(x, y, t)=g(conf(x, y, t)) and the other $\lambda$ values at the position (x, y, t) are g(conf_max)−g(conf (x, y, t)). Here, conf_max is the maximum possible value of the confidence level. As mentioned above, by placing importance on motion constraints when the confidence level of motion estimation is high while raising the proportion of external model constraints when the confidence level is low, it is possible to suppress image degradation and increase a spatial and temporal resolution even at the position where accurate motion estimation cannot be performed. In the above example, a plurality of constraints are used all together as external model constraints. However, another constraint may be further added, and even if only some of these constraints are used, the effect of the present invention can be obtained.

Next, in Step 605, the integration processing unit 104a obtains a high-speed and high-resolution video sequence which minimizes a constraint J. Such a high-speed and high-resolution video sequence which minimizes the constraint J can be obtained, for example, by solving the following Equation 15 where a value obtained by differentiating the constraint J by each pixel value of the high-speed and high-resolution video sequence is 0, or using an iteration method such as a maximum grading scale. Lastly, in Step 606, the integration processing unit 104a outputs the generated high-speed and high-resolution video sequence.

$$\frac{\partial J}{\partial HH(x, y, t)} = 0$$ [Equation 15]

A more specific example of a set of inputted images and outputted images will be described with reference to FIGS. 11 to 15. For ease of explanation, an explanation is given using a video sequence including four frames, each consisting of six pixels by six pixels. These four frames can be considered as a part of a video sequence which is larger in size and frame number.

Figure 11:
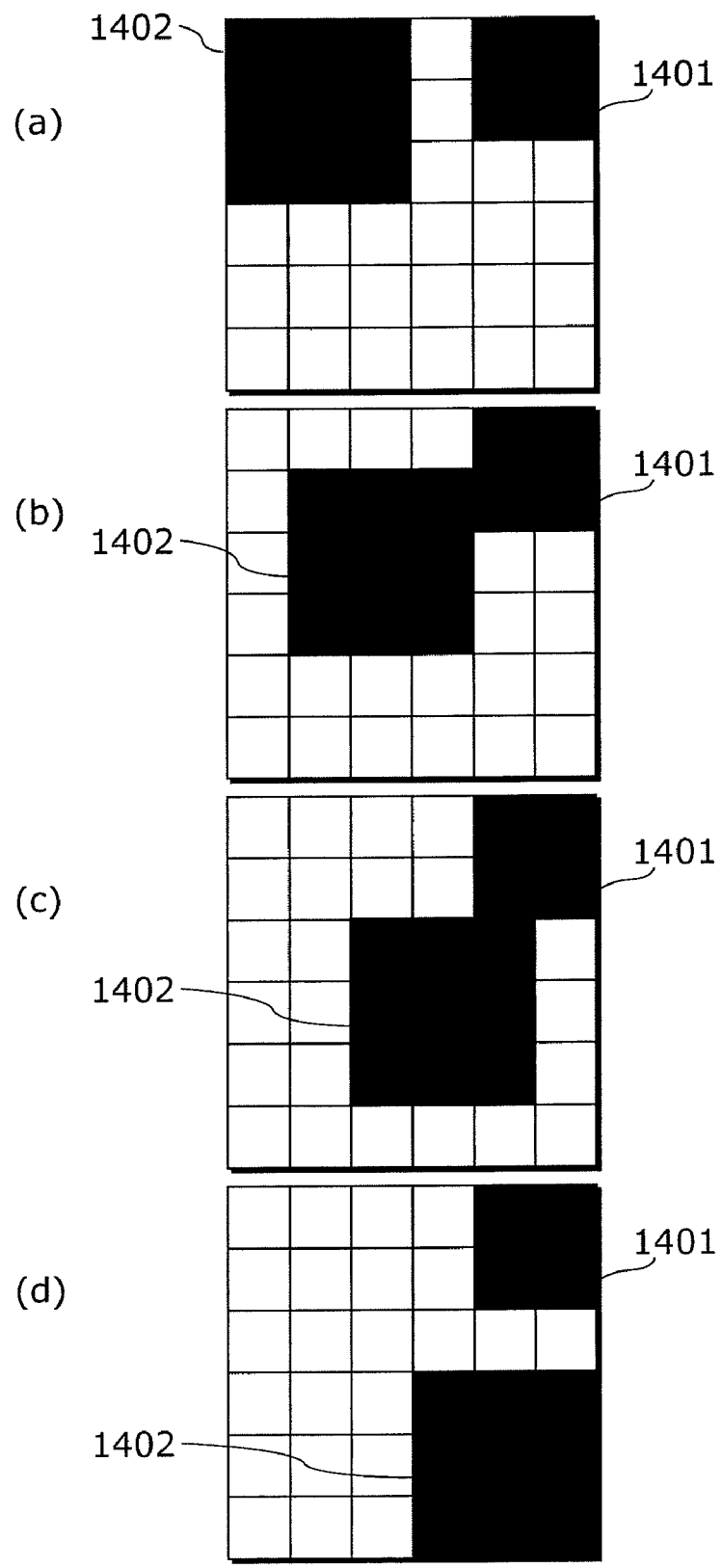
FIG. 11($a$) to ($d$) shows examples of frame images of a generated high-speed and high-resolution video sequence.

FIG. 11(*a*) to (*d*) shows example images obtained by photographing an object at high speed and high resolution. The images in FIG. 11(*a*) to (*d*) cannot inherently be captured by photographing, but are shown just as example images for explanation. In FIG. 11, (a) to (d) show four frames placed in time order, in which a still object 1401 and a moving object 1402 are shown.

Figure 12:
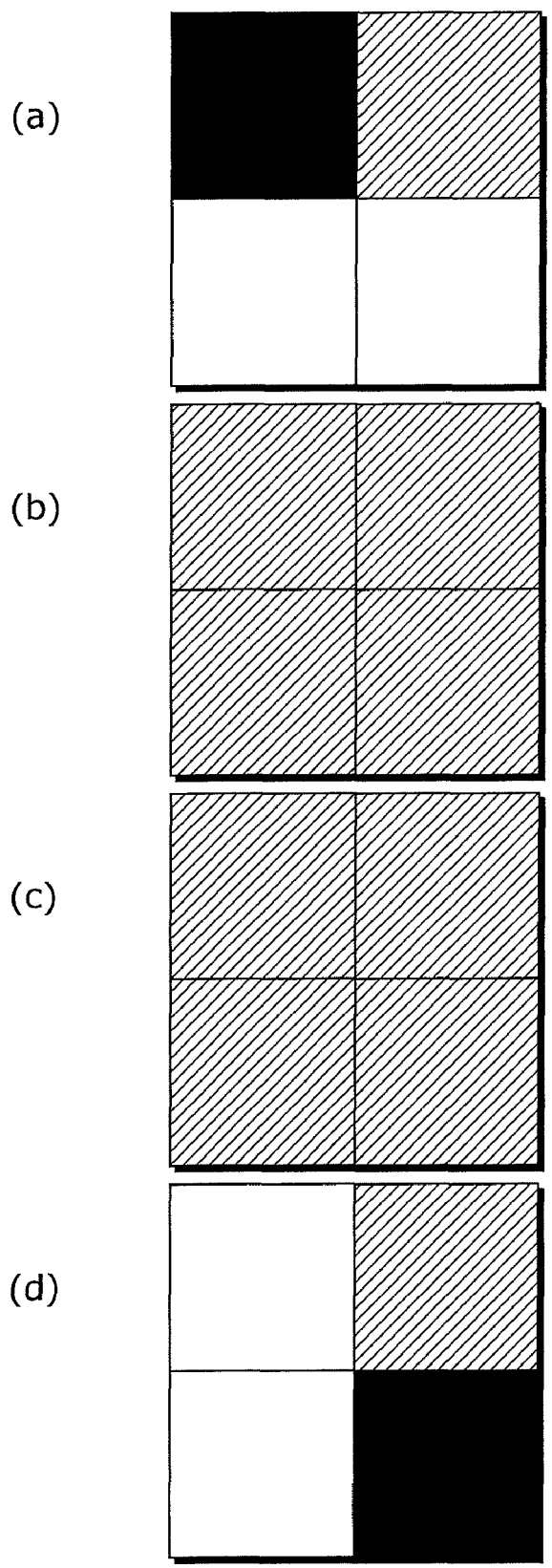
FIG. 12($a$) to ($d$) shows examples of frame images of an inputted high-speed and low-resolution video sequence.

For these objects, a high-speed and low-resolution video sequence and a low-speed and high-resolution video sequence are captured (Step 601). FIG. 12(*a*) to (*d*) shows example images of these objects in the high-speed and low-resolution video sequence (whose number of vertical and horizontal pixels is one third of that of the low-speed and high-resolution video sequence). In FIG. 12, (a) to (d) show frames corresponding to the frames shown in (a) to (d) of FIG. 11 in image capturing time. In these images, pixels having the intermediate values between black pixels and white pixels are shaded diagonally from upper right to left below. The number of frames is same as that in FIG. 11(*a*) to (*d*), while the spatial resolution is lower than that in FIG. 11(*a*) to (*d*).

Figure 13:
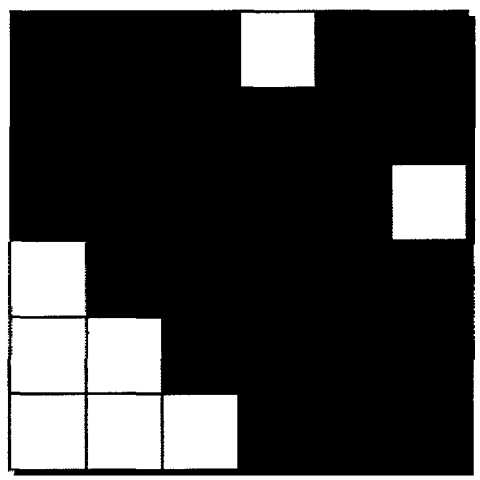
FIG. 13 is a diagram which shows an example of a frame image of an inputted low-speed and high-resolution video sequence.

Similarly, FIG. 13 shows an example image (of one frame) of these objects in the low-speed and high-resolution video sequence. The spatial resolution is the same as that in FIG. 11(*a*) to (*d*), but the object 1402 is photographed as an after-image because this image is exposed for a time period equivalent to the four frames shown in FIG. 11(*a*) to (*d*).

Next, the motion estimation unit 103 obtains the motion of the object in the images and the confidence level of the motion from the high-speed and low-resolution video sequence (Step 602). Since the images in FIG. 11(*a*) to (*d*) show a part of a larger image, it is also possible to obtain the result of motion estimation regarding the image areas shown in FIG. 11(*a*) to (*d*) from the result of motion estimation performed across the larger image.

Figure 14:
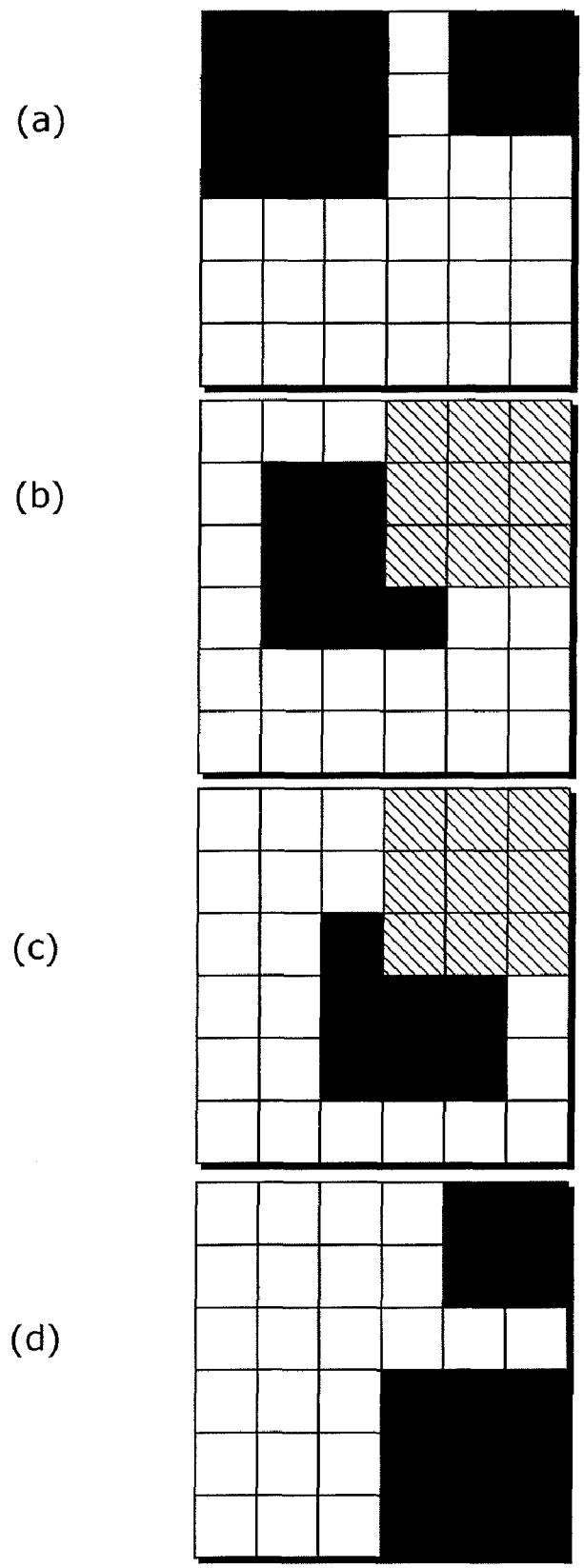
FIG. 14($a$) to ($d$) shows an example of distribution of confidence levels.
Figure 17:
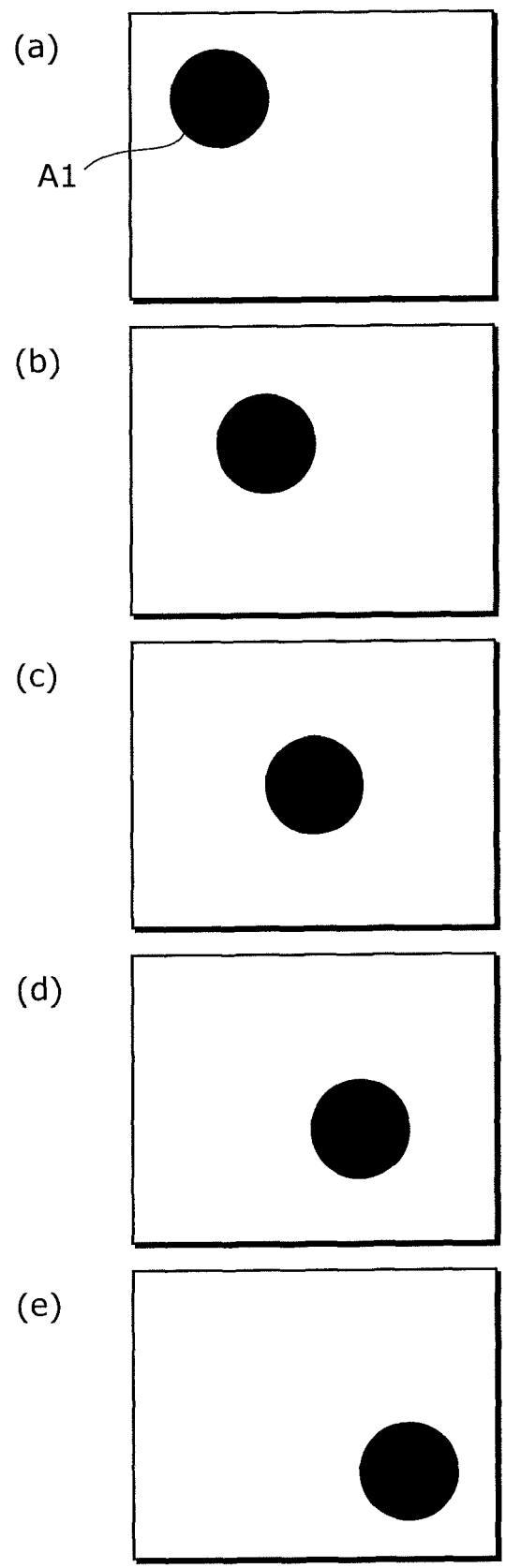
FIG. 17($a$) to ($e$) shows examples of frame images of an ideal high-speed and high-resolution video sequence.
Figure 18:
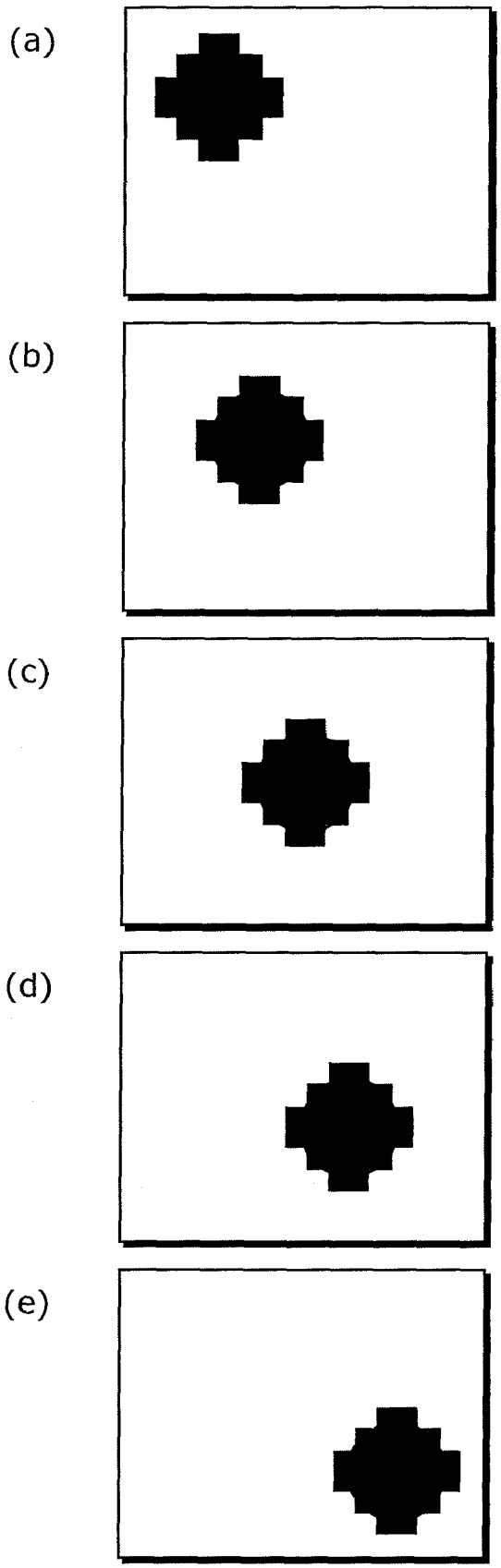
FIG. 18($a$) to ($e$) shows examples of frame images of a high-speed and low-resolution video sequence.

FIG. 14(*a*) to (*d*) shows an example of distributions of confidence levels. In FIG. 14, (a) to (d) show frames corresponding to the frames shown in (a) to (d) of FIG. 11 in image capturing time. In FIGS. 14(*b*) and (*c*), areas of lower confidence levels of motion estimation are shaded diagonally from upper left to right below, while areas of higher confidence levels of motion estimation are shown as white or black areas. Here, both the black and white pixels represent the relationship with the objects, there is no difference in confidence level between them. The motion estimation results for the still object and the background are considered to have an amount of motion of 0.

In FIG. 11(*a*) to (*d*), in the area where the two objects 1401 and 1402 get close to each other, accurate motion estimation is difficult. The constraint control unit 104b sets an overall constraint from the constraints which have been set using the motion estimation result in Step 603 and the external constraints for the area of a lower confidence level. Then the integration processing unit 104a generates a high-speed and high-resolution video sequence using the overall constraint and outputs the resulting video sequence (Steps 605 and 606).

FIG. 15 shows an example of generated images.

In FIG. 15, (a) to (d) show frames corresponding to the frames shown in (a) to (d) of FIG. 11 in image capturing time. These images are similar to the images in FIG. 11 which cannot inherently be obtained by photographing, while frames (b) and (c), in which the two objects get close to each other, include the intermediate pixel values.

In order to be compared with FIG. 15, FIG. 16 shows an example of a generated image in the case where only a motion estimation result is used, but a motion confidence level and external constraints are not used. Accurate image generation cannot be performed in the upper right portions in the frames (b) and (c) in FIG. 16 where accurate motion estimation cannot be performed.

Being different from the result seen in FIGS. 16(b) and (c), the result seen in FIG. 15 proves that the integration processing unit 104a can generate a desirable image as a high-speed and high-resolution image. This is realized in the following reasons. The motion estimation is not performed correctly in the upper right portions in the frames (b) and (c) in FIG. 14. The motion estimation is not performed correctly in the upper right portions in the frames (b) and (c) in FIG. 14. Therefore, according to various external constraints, such as the continuity of pixel values between positions in a frame or between frames (Equations 4, 5 or the like), or the continuity of edges between them (Equations 6, 7 or the like) and the tendency of principal components of a video sequence (Equation 9) are used.

Next, an explanation is given, taking as an example, the images shown in FIGS. 17 to 24, about the effect of making the exposure period of a low-speed and high-resolution video sequence longer than the frame interval of a high-speed and low-resolution video sequence.

FIG. 17(a) to (e) shows example images obtained by photographing an object at high speed and high resolution. The images in FIG. 17(a) to (e) cannot inherently be captured by photographing, but are shown just as example images for explanation. In FIG. 17, (a) to (e) show temporally successive five frames placed in time order, in which a moving object A1 is shown.

FIG. 18(a) to (e) shows images of this object in a high-speed and low-resolution video sequence, and FIGS. 19(a) and (b) and 20(a) and (b) show images of this object in a low-speed and high-resolution video sequence. In FIG. 18, (a) to (e) show frame images corresponding to respective frames shown in (a) to (e) of FIG. 17 in time.

Since FIG. 18(a) to (e) shows the low-resolution images in the same size as a high-resolution image, the low level of resolution of these images presents themselves as coarse pixels. In this example, the frame rate of the low-speed and high-resolution video sequence is one fourth of that of the high-speed and low-resolution video sequence, the frame (a) in FIGS. 19 and 20 corresponds to the frame image which is started to be exposed at the time of the frame image (a) in FIG. 17, and the frame (b) in FIGS. 19(b) and 20(b) corresponds to the frame image which is started to be exposed at the time of the frame image (e) in FIG. 17.

FIGS. 19(a) and (b) shows low-speed and high-resolution frame images captured in a shorter exposure period like the conventional art. FIGS. 20(a) and (b) shows low-speed and high-resolution frame images captured in a longer exposure period than the frame rate of high-speed and low-resolution images, as shown in the present invention.

FIGS. 21 to 24 show examples of images generated using the images captured in the above-mentioned processes. In FIGS. 21 to 24, (a) to (e) show frame images corresponding to respective frames shown in (a) to (e) of FIG. 17 in time. In (a) to (e) of FIGS. 22 to 24, diagonally shaded portions are areas having intermediate luminance values between the luminance value of the object A1 and the luminance value of the background.

FIG. 21(a) to (e) and FIG. 22(a) to (e) are examples of images generated using the inputted images of FIG. 18(a) to (e) and FIGS. 19(a) and (b). FIG. 23(a) to (e) and FIG. 24(a) to (e) are examples of images generated using the inputted images of FIG. 18(a) to (e) and FIGS. 20(a) and (b). FIG. 21(a) to (e) are examples of images generated without using motion information. FIG. 22(a) to (e) are examples of images generated using motion information.

Figure 21:
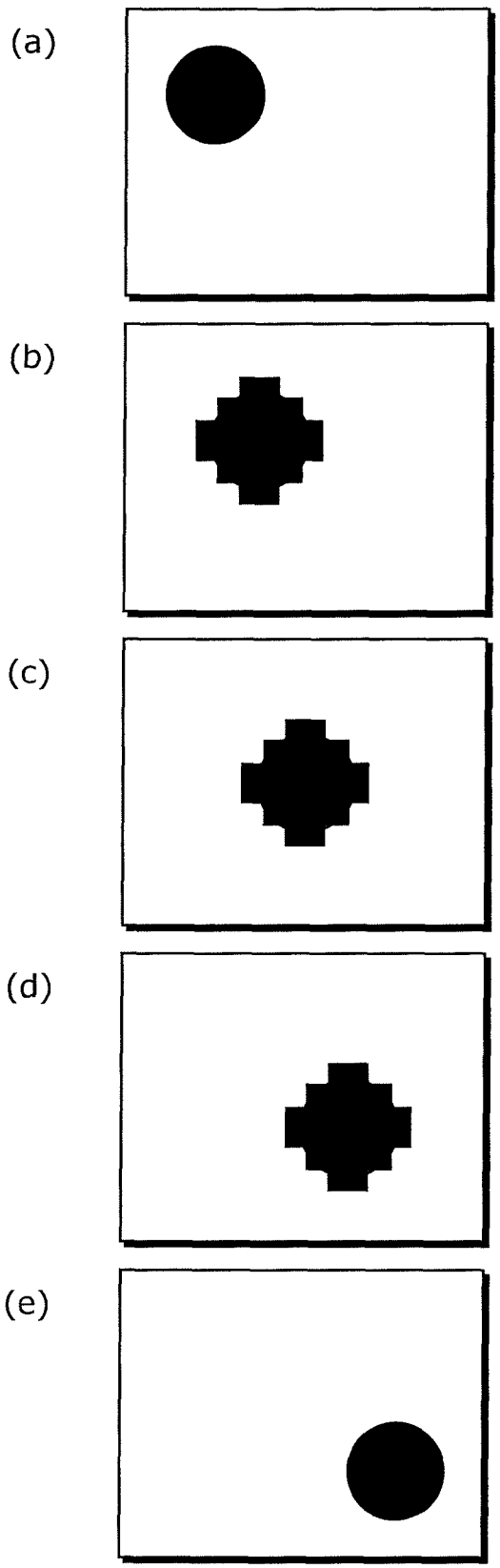
FIG. 21(a) to (e) shows examples of frame images generated with a short exposure period.
Figure 22:
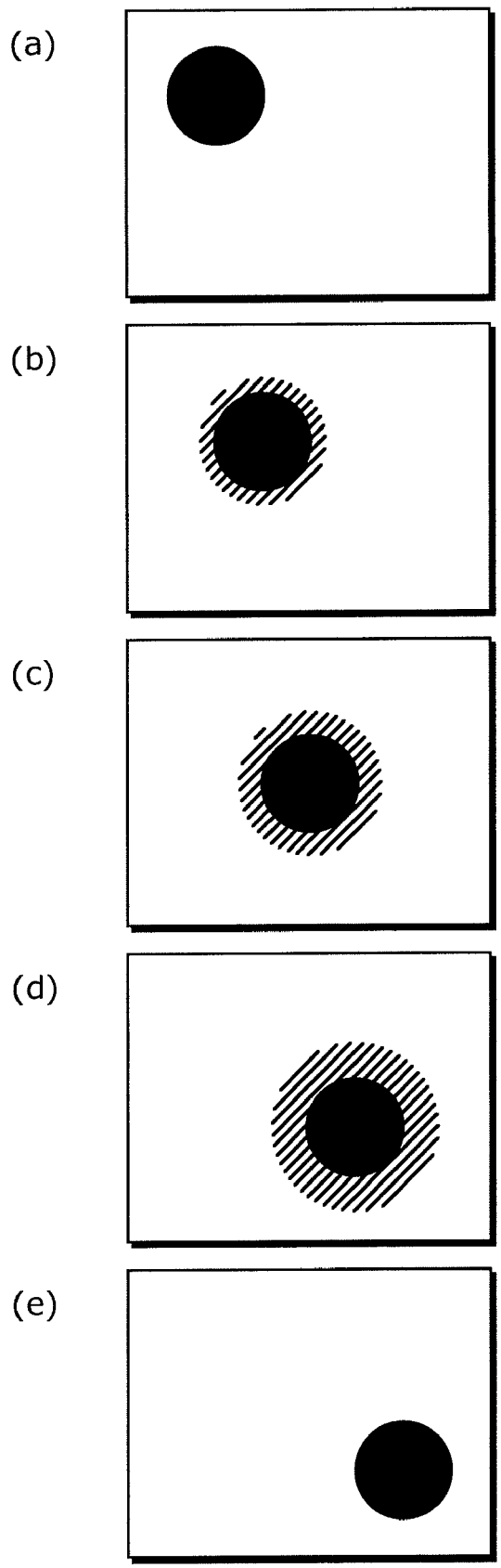
FIG. 22(a) to (e) shows examples of frame images generated with a short exposure period.

The images (a) and (e) in FIGS. 21 and 22 are sharp and clear because they are captured at the same time as the inputted images in FIG. 19. On the other hand, the images (b) to (d) in FIG. 21 has a low resolution equivalent to that of the high-speed and low-resolution images (b) to (d) shown in FIG. 18 because they are captured without using motion information.

In FIG. 22, the images (b) to (d) become blurred more and more with temporal distance from a low-speed and high-resolution frame image, and the image (e) returns to a clear state when it reaches the next low-speed and high-resolution frame image.

This results from decreased accuracy in motion estimation from a high-speed and low-resolution image as well as inevitable errors in motion estimation itself, while the spatial resolution of the generated images (b) to (d) of FIG. 22 need to be improved using motion information obtained from the low-speed and high-resolution image. Since these motion estimation errors accumulate in each frame, its sharpness and clarity decrease gradually.

When inputted images as shown in FIGS. 19(a) and (b) are used, if motion estimation information cannot be obtained or it is inaccurate, the sharpness of the generated images (b) to (d) of FIG. 22 not only gradually decreases but also greatly varies periodically (in this example, at intervals of four frames), thereby causing poor quality of images. This tendency becomes increasingly prominent as the frame interval of a low-speed and high-resolution video sequence becomes longer.

However, it is actually difficult to perform highly accurate motion estimation from a low-resolution image because of complex changes or occlusion of an object shape in an image, change in illumination conditions, and so forth.

FIG. 23(a) to (e) are examples of images generated without using motion information. FIG. 24(a) to (e) are examples of images generated using motion information. The clearness of the images of FIGS. 23(a) to (3) is slightly less than the clearness of the images of FIG. 17(a) to (e) and FIGS. 19(a) and (b). However, the clearness of the images of FIGS. 23(a) to (3) is not reduced significantly as much as the images of FIG. 22(d). In the images in FIG. 23, since the temporal variations of the sharpness is suppressed, the temporal deterioration in the sharpness can be alleviated. Furthermore, since the images in FIG. 24(a) to (e) are generated using motion information, their sharpness is further improved than the images in FIG. 23(a) to (e).

In the conventional image generation method as described above, each image is clearly captured by shortening the exposure period for both high-speed and low-resolution images and low-speed and high-resolution images so as to suppress motion blur. However, this method is not necessarily desirable in terms of maintaining the stable quality of generated images and reflecting the sudden changes in the images to generated images.

Unlike such a conventional method, the image generation method according to the present invention is characterized in that images are generated using low-speed and high-resolution images obtained by long-time exposure in which motion blur may occur, in order to improve the sharpness and clarity of high-speed and high-resolution images to be generated and to suppress the changes in the image sharpness from frame to frame.

Therefore, it is possible not only to suppress the changes in the image quality from frame to frame even in the case where motion estimation is not performed, but also to improve the image sharpness by adding motion information of the images.

Furthermore, since only highly confident motion information obtained based on the confidence level of motion estimation is used, it is possible to suppress the degradation of image quality due to inaccurate motion information.

As for a longer exposure period, the above-mentioned effects can be achieved more easily by opening the shutter at frame intervals of low-speed images. Actually, there may be an unexposed time period between the end of exposure of a frame and the start of exposure of the next frame. Even in such a case, by making the exposure period as long as possible, it is possible to achieve the effects of the present invention.

Note that whether or not an image has been generated using long-time photographing can be judged based on whether or not the generated image includes a sudden change in high-resolution images when such a change occurs in the image (a) and the image (b) in FIG. 19.

The above has described the case where the exposure control unit 105 controls to temporally set an exposure amount to be constant in an exposure period for each frame in a low-speed and high-resolution video sequence. The following describes the case where the exposure control unit 105 controls to temporally change an exposure amount within an exposure period for each frame in a low-speed and high-resolution video sequence.

Figure 25:
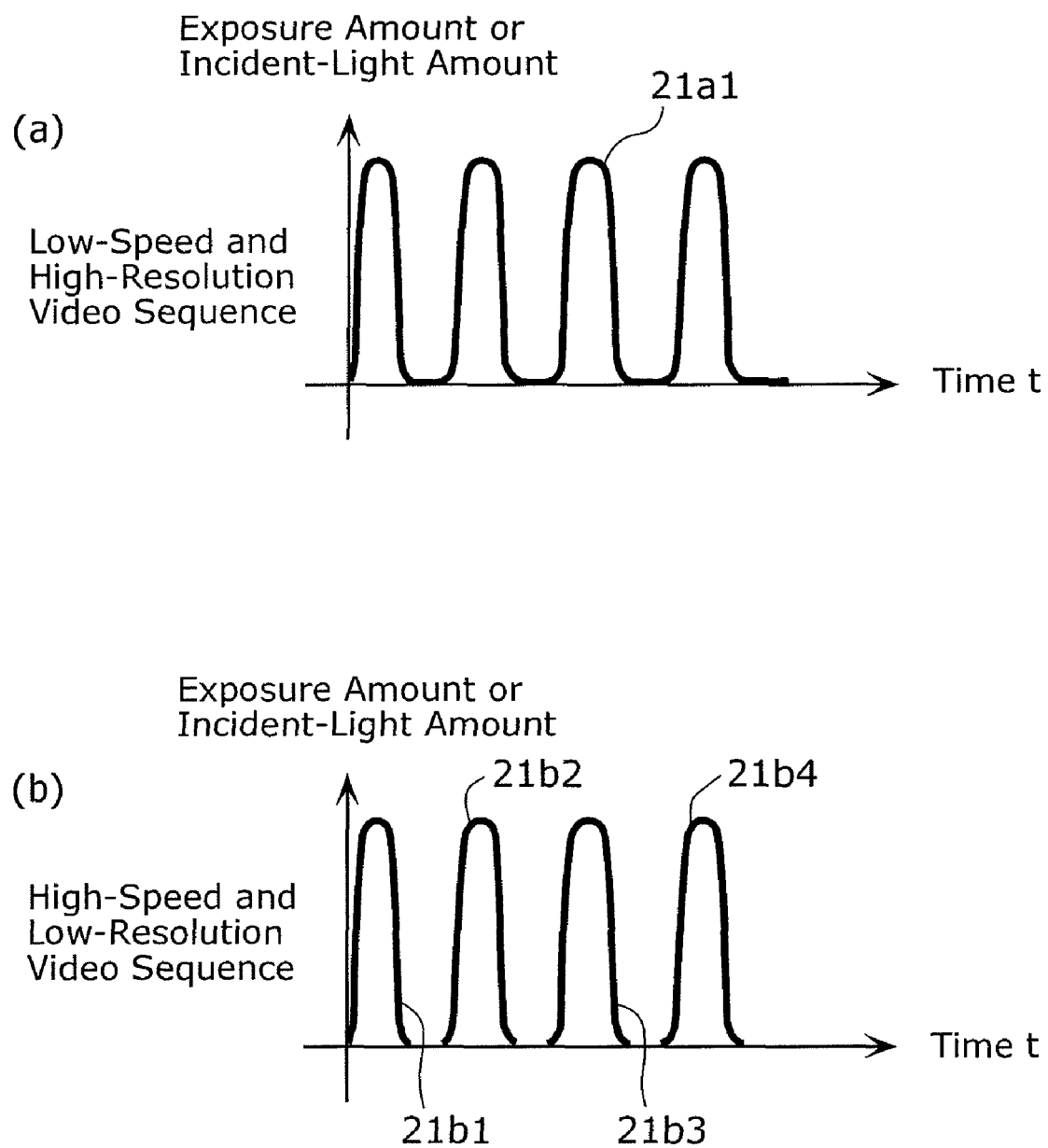
FIGS. 25(a) and (b) shows temporal changes in an exposure amount within an exposure period of a frame.

FIG. 25(a) shows temporal changes in an exposure amount within an exposure period for each frame in a low-speed and high-resolution video sequence received by the low-speed image receiving unit 101b. FIG. 25(b) shows temporal changes in an exposure amount within an exposure period for each frame in a high-speed and low-resolution video sequence received by the high-speed image receiving unit 101a. In FIGS. 25(a) and (b), a vertical axis represents a time, and a horizontal axis represents an exposure amount at the time of capturing. Each of (a) and (b) in FIG. 25 shows temporal changes in an exposure amount within the same period regarding each video sequence. Each thick line represents the temporal changes in the exposure amount required to generate one frame in each video sequence.

In (a) of FIG. 25, as seen by a thick line 21a1, in a single exposure period required to generate one frame of the low-speed and high-resolution video sequence, there are four exposure states and four non-exposure sates alternately. In (b) of FIG. 25, in the same single period as the FIG. 25(a), there are four exposure processes (as seen by thick lines 21b1, 21b2, 21b3, and 21b4) to generate four frames of a high-speed and low-resolution video sequence.

The process of deterioration in a high-speed and low-resolution video sequence has been described with reference to FIG. 8(b), assuming that a frame interval is equal to an exposure period (in other words, open exposure is performed for each frame. However, in this example, as shown in (b) of FIG. 25, it is controlled to generate frames of the high-speed and low-resolution video sequence with an exposure period which is shorter than a frame interval (in other words, a part of the exposure period of each frame is a non-exposure period). Furthermore, light-reduction periods within the single exposure period for one frame of the low-speed and high-resolution video sequence of FIG. 25(a) are set in synchronization with four non-exposure periods for the high-speed and low-resolution video sequence (in each of which exposure is not performed) as seen in FIG. 25(b), respectively.

Figure 26:
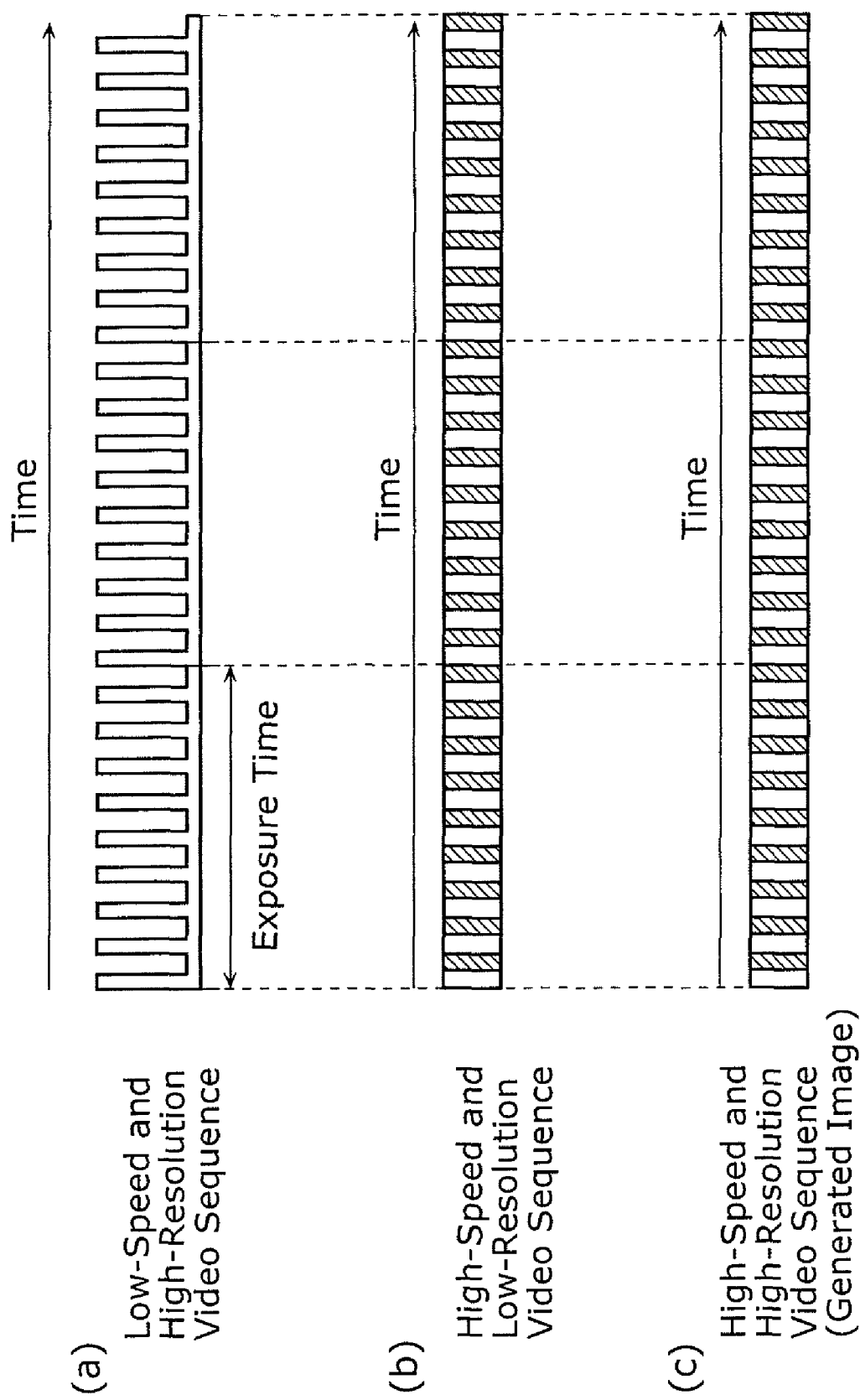
FIG. 26(a) to (c) explains a relationship between an exposure timing of an inputted image and a virtual exposure timing of a generated image.

Next, a relationship between an exposure timing of an inputted image and a virtual exposure timing of a generated image is described with reference to FIG. 26. Here, the virtual exposure timing is an exposure timing in the case where an image corresponding to a generated image has been actually captured.

FIG. 26(a) shows exposure timings for frames of a low-speed and high-resolution video sequence. The exposure timing is a timing for starting an exposure period for one frame is between broken lines. A non-exposure timing is a timing for starting an period during which exposure is not performed. Here, each top of a vertical axis represents a state where exposure is performed, while each bottom of the vertical axis represents a state where exposure is not performed. Hereinafter, the stage where exposure is performed is referred to as a exposure state, and the state where exposure is not performed is referred to as a non-exposure state. In FIG. 26(a), the exposure state and the non-exposure state are repeated alternately nine times for one frame. FIG. 26(b) shows exposure timings for frames of a high-speed and low-resolution video sequence which is captured at the same time as FIG. 26(a). Here, white portions are exposure periods and shaded portions are non-exposure periods of the high-speed and low-resolution video sequence.

Regarding the high-speed and low-resolution video sequence, each frame has one exposure state and one non-exposure state. In FIG. (b), nine frames of the high-speed and low-resolution video sequence are included in the same period as one frame of the low-speed and high-resolution video sequence.

FIG. 26(c) shows virtual exposure timings of a generated image (high-speed and high-resolution video sequence).

Here, the exposure period of FIG. 26(a) matches the exposure period of FIG. 26(b). This relationship is realized, for example, when the exposure control unit 105 controls the image capturing apparatus 10 to also reduce respective exposure amounts for frames of the high-speed and low-resolution video sequence, in synchronization with the non-exposure periods for one frame of the low-speed and high-resolution video sequence.

Furthermore, this relationship can also be realized, when the exposure control unit 105 controls the image capturing apparatus 10 to perform exposure for one frame of the low-speed and high-resolution video sequence in synchronization with the exposure periods for frames of the high-speed and low-resolution video sequence, in the case where a predetermined part of each frame period of the high-speed and low-resolution video sequence is set to be an exposure period and a remained part is set to be a non-exposure period.

From the video sequences which are captured to satisfy the above relationship, a video sequence having the virtual exposure timings as shown in FIG. 26(c) is generated. As a result, there are the following advantages.

This means that, even if exposure periods and non-exposure periods are mixed, the linear equations such as Equations 1 and 2 are satisfied. Therefore, the image generation processing does not need to be complicated due to the exposure and non-exposure timings. In addition, in the case where exposure timings and non-exposure timings are mixed, a ratio of high frequency components is increased in frequency characteristics in a temporal direction of an inputted image. As a result, efficiency of reproducing high frequency components in a temporal direction of a generated image is also improved.

In Step 601 and steps following Step 601, the processing is the same as the case where there is no temporal change in an exposure amount. Here, it is assumed that the same object as the case of FIG. 17(a) to (e) moves fast.

Figure 28:
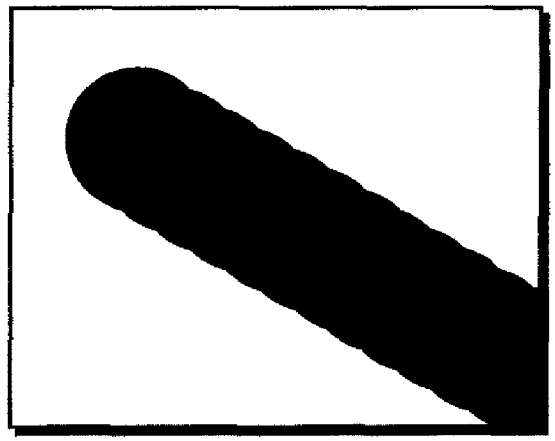
FIG. 28 is a diagram showing an example of a frame image of a low-speed and high-resolution video sequence.

FIG. 27(a) to (c) shows examples of frame images of a high-speed and low-resolution video sequence, in the case where the exposure control unit 105 does not control to temporally change an exposure amount for each frame in a low-speed and high-resolution video sequence, and a frame interval is equal to an exposure period for each frame in a high-speed and low-resolution video sequence. (a), (b), and (c) of FIG. 27 are successive frame images. Here, motion blur is noticed in each frame image. This is because, even in a high-speed video sequence, an object moves significantly between frames. FIG. 28 is an example of frame images of a low-speed and high-resolution video sequence captured at the same time as FIG. 27. In FIG. 28, the video sequence is captured in a period corresponding to periods for the three frames of (a), (b), and (c) of FIG. 27, without any temporal change in exposure amounts. Therefore, more noticeable motion blur is seen in FIG. 27.

FIG. 29(a) to (c) shows examples of a result of performing, on the frame images of the high-speed and low-resolution video sequence of FIG. 27(a) to (c) and the frame image of the low-speed and high-resolution video sequence of FIG. 28, the same processing as the video sequence generation of FIG. 24(a) to (e). Periods for (a), (b), and (c) of FIG. 29 correspond to the periods for the frames of (a), (b), and (c) of FIG. 27, respectively.

In (a) to (c) of FIG. 29, frame images are generated with a resolution higher than a resolution of the frame images of (a) to (c) of FIG. 27 and at the same frame rate as the frame rate of the high-speed and low-resolution video sequence. However, the motion blur in the images of (a) to (c) of FIG. 27 is noticed also in the images of (a) to (c) of FIG. 29. This is because it is difficult to obtain information regarding motion faster than the frame rate of the high-speed and low-resolution video sequence at the capturing time.

Next, described is the case where there are temporal changes in an exposure amount as shown in (a) and (b) of FIG. 25, regarding the same fast-moving object. FIG. 30(a) to (c) and FIG. 31 show examples of images which are captured when the exposure control unit 105 performs control to temporally change an exposure amount for each frame of a low-speed and high-resolution video sequence.

Figure 31:
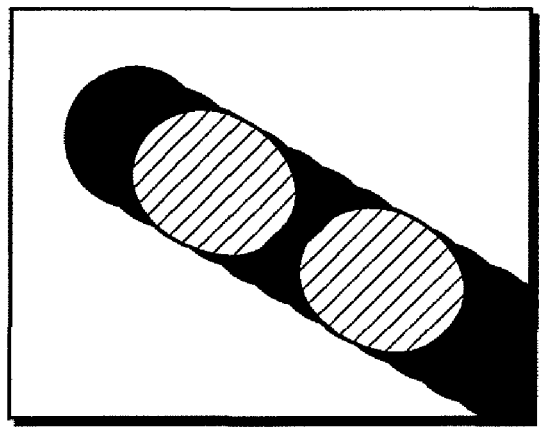
FIG. 31 is a diagram showing an example of a frame image of a low-speed and high-resolution video sequence in the case where an exposure amount is changed.

FIG. 31 shows the low-speed and high-resolution video sequence which is generated when the same object as FIG. 28 is photographed by temporally changing an exposure amount as shown in FIG. 25(a). Here, in FIG. 31, a shaded portion shows an intermediate pixel value (luminance value) between a black portion and a white portion. Since the exposure amount is temporally changed, the pixel value (luminance value) of the object is also changed along a direction of the motion.

FIG. 30(a) to (c) shows the high-speed and low-resolution video sequence in the case where an exposure period for the high-speed and low-resolution video sequence is set in synchronization with an exposure interval for the low-speed and high-resolution video sequence as shown in FIG. 25(b). An amount of the motion of the object between the frames is not changed between FIG. 27(a) to (c) and FIG. 30(a) to (c). However, since the exposure is short, in FIG. 30(a) to (c), motion blur regarding the object in each frame image is less than the case of FIG. 27(a) to (c).

The images generated using such inputted image are shown in FIG. 32(a) to (c). In FIG. 32(a) to (c), a high-resolution video sequence has motion blur less than FIG. 29(a) to (c). This is because, although the same object as FIG. 29(a) to (c) is captured with the same frame rate as FIG. 29(a) to (c), the exposure amount is changed temporally, so that information having a temporally-high frequency is obtained to be used for the image generation.

It has been described, in the above examples, the case where images are captured when light reduction elimination periods (in which light amount is not reduced) for a frame in a low-speed and high-resolution video sequence are in synchronization with exposure periods for frames in a high-speed and low-resolution video sequence, as shown in FIGS. 25(a) and (b). On the other hand, the following describes the case where light reduction elimination period for a low-speed and high-resolution video sequence are not in synchronization with exposure periods for a high-speed and low-resolution video sequence with reference to FIGS. 33(a) and (b).

FIG. 33(a) shows temporal changes in an exposure amount which are the same as the case of FIG. 25(a). In FIG. 33(b), however, a frame rate of a high-speed and low-resolution video sequence is a half of the frame rate of FIG. 25(b), and frames corresponding to exposure periods shown by broken lines 22b2 and 22b4 are not actually captured.

In the above case, a motion vector between frame images is estimated using two frame images captured with exposure shown by thick lines 22b1 and 22b3. Then, an image which is predicted to be generated in an exposure period shown by the broken line 22b2 is generated using a motion of a corresponding point between other frame images. In the same manner, an image which is predicted to be generated in an exposure period shown by the broken line 22b4 is generated using frame images immediately prior and immediately after the image. The above-explained generation can be realized by interpolation in a temporal direction which is a prior art.

After generating the frame images corresponding to the exposure periods shown by broken lines 22b2 and 22b4 as described above, the same processing as the processing of FIG. 25(b) is performed. Thereby, it is possible to generate an image which is a high-speed and high-resolution video sequence with suppressed motion blur as shown in FIG. 32(a) to (c).

However, it is desirable that an exposure amount for each frame of the low-speed and high-resolution video sequence is temporally changed in synchronization with exposure periods for frames of the high-speed and low-resolution video sequence. By temporally changing the exposure amount for the low-speed and high-resolution video sequence in synchronization with the exposure periods for the high-speed and low-resolution video sequence, there are advantages of suppressing an excess or deficiency in a temporal direction regarding information obtained from both of the video sequences, and thereby suppressing an occurrence of errors or an increase of arithmetic operation amounts due to additional processing such as estimation of images in non-capturing periods.

Note that the method of temporally changing an exposure amount may be realized by setting a device having the same function as a function of an opening and closing mechanical shutter, a liquid crystal shutter, or the like, at a location nearer the object than an imaging unit. Note also that an exposure amount may be temporally changed by changing illuminating.

When the illuminating is changed to temporally change an exposure amount, it is easy to form devices to be added, and to change the exposure amount at a high speed. However, if the object is far from the image capturing apparatus, it is necessary to increase intensity of the illumination. On the other hand, when the shutter or the like is used to temporally change an exposure amount, there are advantages that the method can be used regardless of the distance of the object. In order to achieve the advantages of the present invention, the above methods can be used individually or in combination.

As described above, by temporally changing an exposure amount for each frame in a low-speed and high-resolution video sequence, it is possible to generate a new video sequence by using information having a temporally higher frequency in comparison with the case where there is no temporal change in an exposure amount. As a result, it is possible to generate a new video sequence having higher efficiency of reproducing high frequency components, such as a video sequence in which motion blur is suppressed in each frame image.

In the above example, the image integration unit 104 only outputs generated images. However, it may output the confidence levels of the generated images in addition to the images themselves. A confidence level γ of a generated image is a value which predicts the degree to which a high-speed and high-resolution image is accurately generated. The value γ can be determined using the total sum of confidence levels of motions shown in the following Equation 16, the ratio N/M between the number of effective constraints N and the total number of pixels M (which is the number of frames multiplied by the number of pixels of each frame image) of a target video sequence, and so forth.

$$\gamma = \sum_{x=0}^{X_{max}} \sum_{y=0}^{Y_{max}} \sum_{t=0}^{T_{max}} conf(x, y, t)$$ [Equation 16]

where N=Nh+Nl+NλxC, Nh is the total number of pixels of high-speed images (the number of frames multiplied by the number of pixels of one frame image), Nl is the total number of pixels of low-speed images, Nλ is the total number of spatial and temporal positions (x, y, t) at which external constraints are to be imposed, and C is the number of types of the external constraints.

Note that in the case where an equation like Equation 15 is solved as a linear simultaneous equation, the number of conditions indicating the stability of solution calculation, described in Cline, A. K., Moler, C. B., Stewart, G. W. and Wilkinson, J. H., "an Estimate for the Condition Number of a Matrix", SIAM J. Num. Anal. 16 (1979), 368-375 (Non-Patent Reference 5) and the like, can be used as a confidence level.

If a motion confidence level is high, it can be expected that the confidence level of a video sequence generated using a motion constraint is also high. Furthermore, when there are a lot of effective constraints for the total number of pixels of a video sequence to be generated, a video sequence as a solution can be generated stably, and thus the confidence level of the generated sequence is also expected to be high. Similarly, since it is expected that a small number of constraints leads to a smaller error between the solutions, the confidence level of the generated video sequence is also expected to be high.

By outputting the confidence level of a generated video sequence, it is possible to increase the compression ratio of the outputted video sequence to be coded and compressed according to MPEG when its confidence level is low, and to decrease the compression ratio thereof when its confidence level is high.

Figure 34:
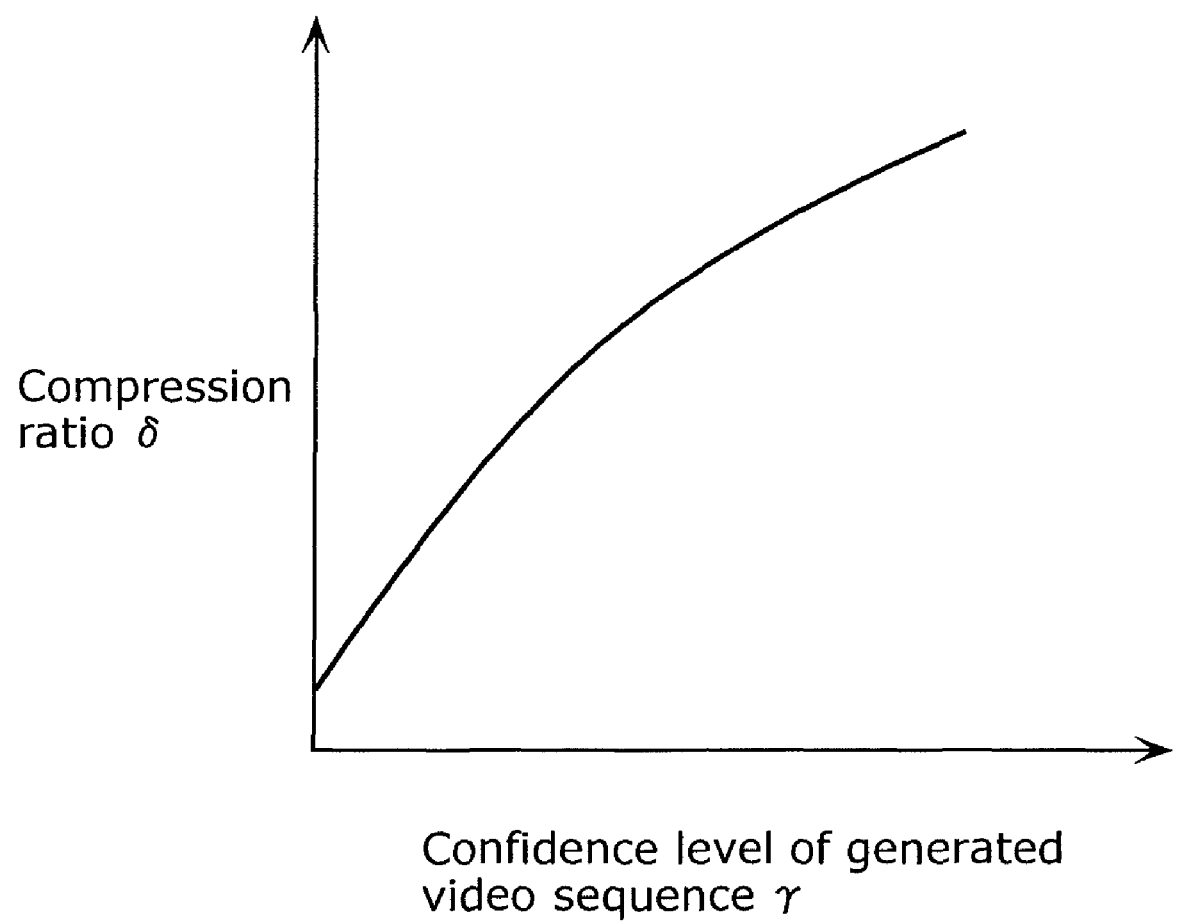
FIG. 34 is a graph which shows an example of the relationship between a confidence level and a compression ratio used when the compression ratio for coding an image is changed using the confidence level of a generated image.

Therefore, an appropriate compression ratio can be set. For example, a confidence level γ of a generated video sequence and a compression ratio δ for coding the sequence are set in monotonically increasing relationship as shown in FIG. 34, and coding is performed at the compression ratio δ which corresponds to the value γ of the confidence level of the generated video sequence. Since the generated video sequence may include a certain margin of error when its confidence level is low, it is expected that a substantial loss of information does not occur even at an increased compression ratio. Therefore, an effective reduction of data amount can be achieved.

Here, a compression ratio is a ratio of an amount of coded image data with respect to an amount of original image data. The amount of coded data decreases and thus the quality of the decoded data decreases, as the compression ratio increases (i.e., as the compression ratio has a larger value).

Similarly, in an MPEG environment or the like, by setting a highly confident frame preferentially to be a frame to be intra-coded such as an I-picture and other frames to be frames to be inter-coded, it is possible to improve the quality of a reproduced video sequence when it is fast-forwarded or paused.

For example, as for the above generated video sequence, the confidence level γ(t) of each frame is calculated, where t is a frame time. In order to select a frame to be intra-coded from among successive frames, such a frame is selected from among frames having values γ(t) larger than a predetermined threshold value γ(t), or a frame having the largest value γ(t) is selected from among frames of a predetermined section of successive frames.

Note that the effects of the present invention can be achieved, regardless of whether or not coding processing is performed on the outputted video sequence.

The above example has been explained on the assumption that a pixel value is a single luminance value. However, it is also possible to generate a high-speed and high-resolution video sequence from color images by performing the above processing for luminance values on each of R, G, B components of the color images. There is another method for handling color information more easily to achieve the same effects.

In that method, a low-speed image is divided into luminance components and chrominance components. Then the above processing is performed only on the luminance components so as to generate a high-speed and high-resolution luminance image, and the chrominance components are interpolated to be expanded and added to the high-speed and high-resolution luminance image. In this case, the principal components of the image information are contained in the luminance information. Therefore, even if the chrominance information is interpolated to be expanded, it is possible to generate a higher-speed and higher-resolution video sequence than an inputted video sequence by combining the luminance information and chrominance information, and thus to reduce the processing amount compared with the separate processing of R, G, B components.

Figure 35:
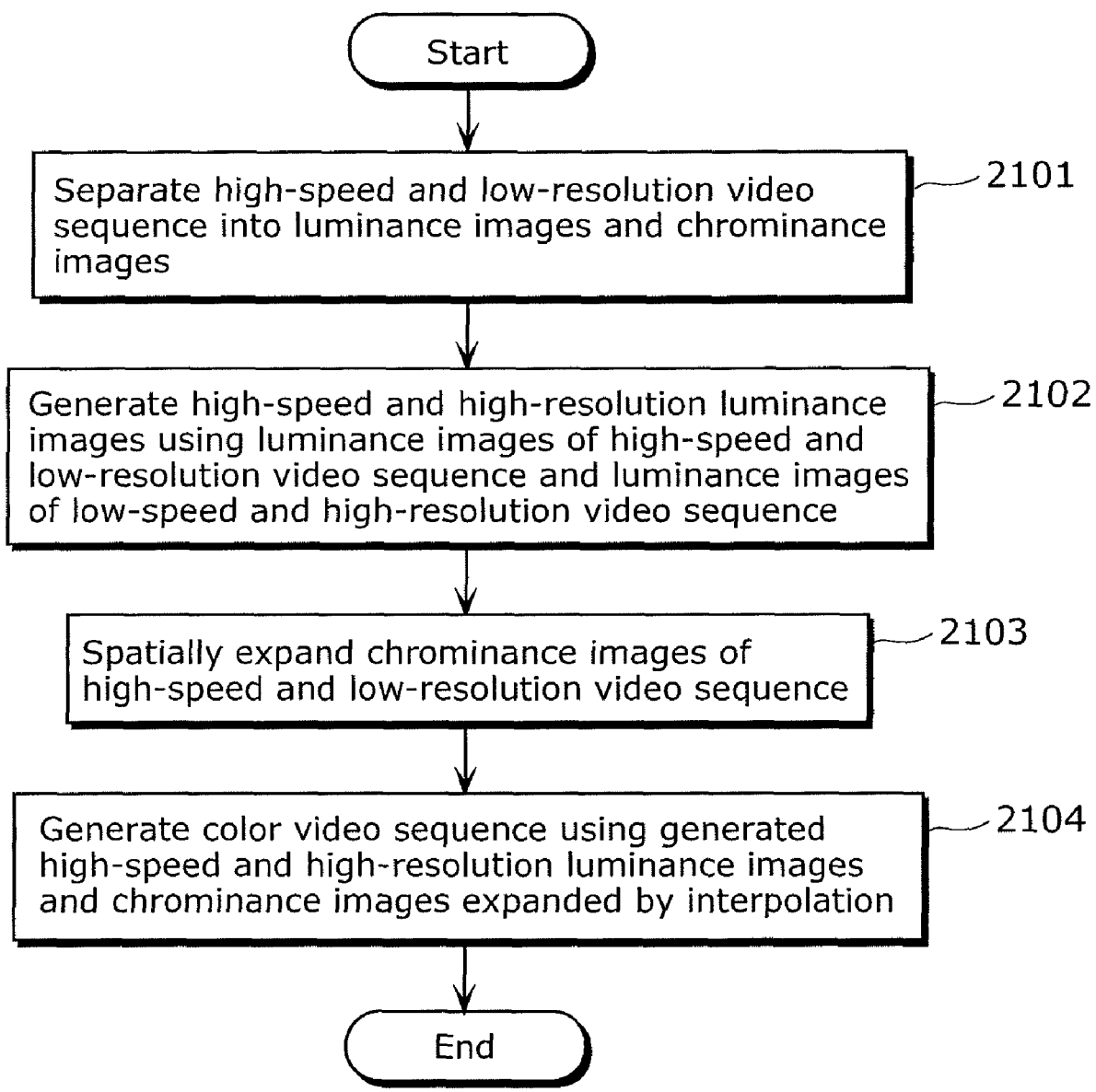
FIG. 35 is a flowchart which shows a sequence of processes for integrating color video sequences.

FIG. 35 shows the sequence of processes to be performed on color images. Images of a high-speed and low-resolution video sequence are divided into luminance images and chrominance images in Step 2101, and then in Step 2102, a high-speed and high-resolution video sequence is generated using these luminance images and the luminance images of a low-speed and high-resolution video sequence, according to the process sequence shown in FIG. 5. In Step 2103, the chrominance images are interpolated to be expanded so as to have the same number of pixels as the high-resolution images. In Step 2104, the generated luminance images and the interpolated and expanded chrominance images are synthesized so as to generate a high-speed and high-resolution color images.

As described above, the image integration unit 104 extracts chrominance information from a high-speed and low-resolution video sequence, and generates a new intermediate video sequence from the luminance information of the high-speed and low-resolution video sequence as well as a low-speed and high-resolution video sequence. Then, the image integration unit 104 adds the chrominance information to the generated intermediate video sequence so as to generate a new final video sequence. Therefore, less processing is required for integrating images of a color video sequence.

As described above, according to the image generation system 100 according to the present embodiment, the constraint control unit 104b determines, according to the confidence level obtained by the motion estimation unit 103, the degree to which external model constraints and motion constraints are to be imposed, and high-speed images and low-speed images are integrated using the imposed constraints. Therefore, it is possible to obtain a high-speed and high-resolution video sequence even when motion estimation cannot be performed or the accuracy of motion estimation is low in the corresponding image area.

Note that the present embodiment describes an example where the entire processing is performed across the video sequence. However, it is acceptable to spatially and temporally divide a video sequence into regions and the same processing as mentioned above is performed on each region so as to generate partial high-speed and high-resolution video sequences, and then to spatially and temporally combine the generated partial video sequences to obtain a high-speed and high-resolution video sequence corresponding to the entire original video sequence. By spatially and temporally dividing a video sequence, it is possible to suppress the calculation processing and memory size required for processing a video sequence including a large number of pixels or frames. Particularly, by dividing a video sequence in the time direction, it is also possible to reduce temporal delay of image generation caused by processing previously inputted frames all at once.

Figure 36:
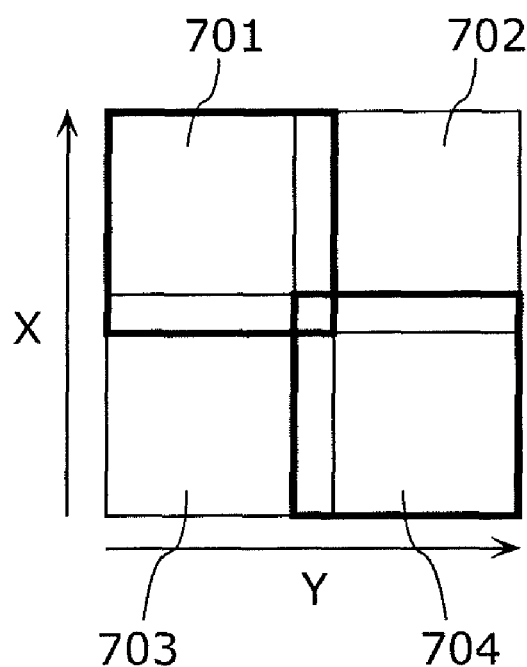
FIG. 36 is a diagram which shows an example of processing for dividing an image into regions.

When an image is divided into regions as mentioned above, respective regions may be set so that adjacent spatial and temporal regions overlap one another near the boundary between them. FIG. 36 shows an example where an image is divided so that adjacent regions overlap one other spatially. In FIG. 36, an image is divided into regions 701 to 704 so that they spatially overlap one another. By generating a video sequence corresponding to each region and then performing weighted averaging on pixel values of each region which overlaps another region, these regions are combined seamlessly. An image may be divided into regions, as is the division shown in FIG. 36, so that adjacent regions overlap one another in the time direction. Such overlapped parts allow suppression of discontinuity between adjacent regions created as division processing results.

Note that in such division processing for allowing regions to overlap one another, the size of the overlapped part is predetermined. The larger the size of the overlapped part is, the more enhanced the effect of reducing discontinuity in processing results between regions to be processed. The smaller the size of the overlapped part is, the more enhanced the effect of suppressing the increased calculation of the overlapped part.

When an image is divided into regions in the time direction, the boundary between adjacent regions may be set in the following manner. A change in an image between frames of a video sequence is previously calculated, and a temporal boundary is set for frames in which the change in the image is greater than a predetermined threshold. For example, a value SSD(t) as shown in the following Equation 17 is defined as a difference between adjacent frame images, and when SSD(t) >th is satisfied, the boundary is set between a frame of time t and a frame of time t+1. Then, the processing of the frames of time t and earlier ones of a sequence is performed separately from the processing of the frame of time t+1 and the following ones.

$$SSD(t) = \sum_{x=0}^{X_{max}} \sum_{y=0}^{Y_{max}} \{I(x, y, t) - I(x, y, t+1)\}^2 \quad \text{[Equation 17]}$$

Here, I(x, y, t) indicates the luminance at a position (x, y) in a frame image of time t, and th indicates a predetermined threshold. A boundary for separating processing need not be determined based on the threshold th, but rather it may be determined to be a time t when the SSD(t) becomes maximum in a sequence in the time domain in which the processing should be separated. By doing so, it is expected that discontinuity in processing results between temporally adjacent regions is less likely to be perceived because the discontinuity becomes relatively small with respect to a change in an image between frames.

The image generation apparatus according to the present invention has been described based on the present embodiment, but the present invention is not limited to this embodiment The present invention also includes other embodiments obtained by adding variations conceived by those of ordinary skill in the art to the present embodiment.

Note that it has been described in the present invention that a target high-speed and high-resolution video sequence is generated when the integration processing unit 104 reduces a difference (the second term in the right side of Equation 12) between (i) a frame value of an inputted still image (one of frames included in a low-speed and high-resolution video sequence) and (ii) a sum of values of frames in the high-speed and high-resolution video sequence included within an exposure period of the still image, according to the overall constraints J of Equation 12 specified by the constraint specification unit 104e.

Here, instead of the sum, it is also possible to use an average value which is calculated by multiplying the sum by a constant number, and which is information that is substantially equivalent to the sum. This means that in the present invention it is also possible to generate a target high-speed and high-resolution video sequence, by reducing a difference between (i) a frame value of the still image and (ii) an average of values of frames in the target high-speed and high-resolution video sequence which are corresponding to an exposure period for the still image.

A part or all of the image generation processing performed by the image generation apparatus according to the present invention may be performed by a dedicated device. Or, a computer terminal apparatus, a communication device placed in a base station or the like, or a CPU integrated in a standalone computer may execute an image generation processing program so as to perform the above-mentioned image generation processing.

Figure 37:
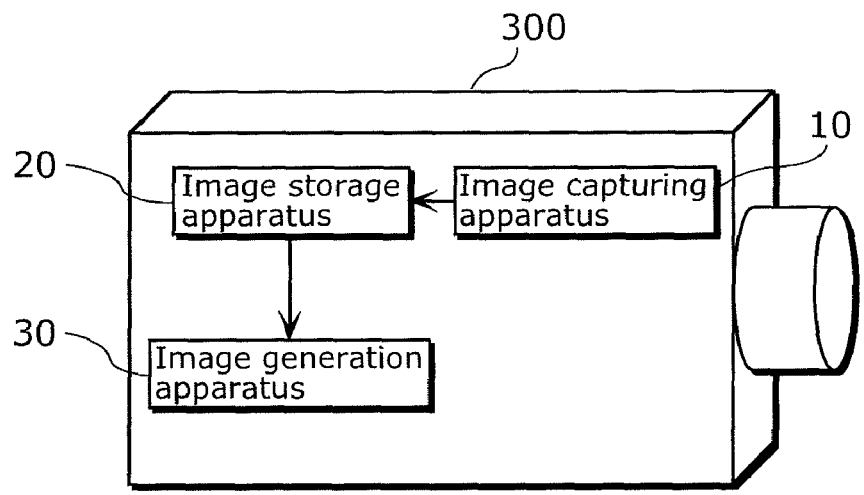
FIG. 37 is a block diagram which shows a specific example of an image generation system.

The present invention may be embodied as a camera 300 as shown in FIG. 37, namely as a standalone apparatus, using a structure including all the units of the image generation system 100 shown in FIG. 3 except for the display apparatus 40.

Furthermore, the present invention may be embodied as a camera with a video recording/playback function by adding the display apparatus 40 to the camera 300 shown in FIG. 37.

Figure 38:
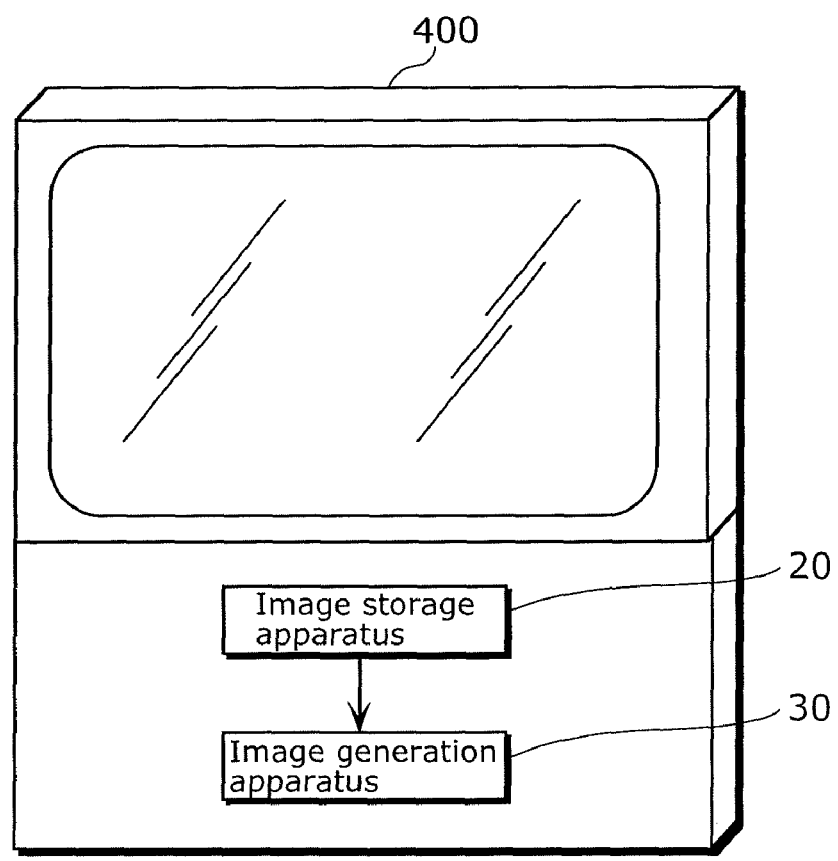
FIG. 38 is a block diagram which shows another specific example of the image generation system.

The present invention may also be embodied as a display device 400 as shown in FIG. 38, using a structure including all the units of the image generation system 100 shown in FIG. 3 but the image capturing apparatus 10. In this case, it is possible to display a previously recorded video sequence with an enhanced spatial and temporal resolution.

Note that the above-mentioned constituent units correspond to the elements defined in the claims as follows. To be more specific, examples of "the exposure control unit", "the image receiving unit", "the motion estimation unit", and "the image integration unit" in the claims correspond to the exposure control unit 105, the image receiving unit 101, the motion estimation unit 103, and the image integration unit 104, respectively. These elements defined in the claims are not limited only to the constituent units of the above embodiments, but also include their equivalents.

INDUSTRIAL APPLICABILITY

The present invention can be used not only as an image generation apparatus which generates a new video sequence from a plurality of video sequences, particularly as an image generation apparatus which generates a high-speed and high-resolution video sequence from a high-speed and low-resolution video sequence and a low-speed and high-resolution video sequence, but also as a video device or system, a video synthesis apparatus, a video editing apparatus, an image reconstruction apparatus, an image reconstruction program, and the like, in which such an image generation apparatus is incorporated.

The invention claimed is:

1. An image generation apparatus that generates, from a first video sequence and a second video sequence that are generated by capturing a same object by an external image capturing apparatus, a new video sequence which represents the same object,
wherein the first video sequence includes frames having a first resolution, the second video sequence includes frames having a second resolution which is higher than the first resolution, each frame of the first video sequence is generated during a first duration of a first exposure period, and each frame of the second video sequence is generated during a second duration of a second exposure period which is longer than the first duration of the first exposure period, said image generation apparatus comprising:
an exposure control unit operable to control the external image capturing apparatus to change an exposure amount during a part of the second exposure period in synchronization with changing of an exposure amount during a part of the first exposure period;
an image input unit operable to receive the first video sequence and the second video sequence from the external image capturing apparatus, the second video sequence being captured under control of said exposure control unit; and
an image integration unit operable to generate, from the first video sequence and the second video sequence received by said image input unit, the new video sequence including frames having a resolution which is equal to or higher than the second resolution, at a frame rate which is equal to or higher than a frame rate of the first video sequence, by reducing a difference between (i) a value of each frame in the second video sequence and (ii) a sum of values of frames in the new video sequence which correspond to the second exposure period for the each frame in the second video sequence.

2. The image generation apparatus according to claim 1, wherein said exposure control unit is operable to control the external image capturing apparatus to set a non-exposure period at least once within the second exposure period such that the exposure amount is reduced during the non-exposure period.

3. The image generation apparatus according to claim 2, wherein said exposure control unit is operable to control the external image capturing apparatus to reduce an exposure amount for a frame in the first video sequence during a part of the first exposure period in synchronization with the non-exposure period for the second video sequence.

4. The image generation apparatus according to claim 1, wherein said exposure control unit is operable to control the external image capturing apparatus to change the exposure amount for a frame in the second video sequence during a part of the second exposure period in synchronization with the first exposure period for a frame in the first video sequence which is included in the second exposure period for the frame in the second video sequence.

5. The image generation apparatus according to claim 1, wherein the external image capturing apparatus includes a light-reduction unit operable to reduce an amount of incident light from the same object, by an amount under control of said exposure control unit, when the second video sequence is generated, and
said exposure control unit is operable to control the external image capturing apparatus to change the exposure amount by controlling the light-reduction unit.

6. The image generation apparatus according to claim 1, wherein the external image capturing apparatus includes an illumination unit operable to illuminate the same object, with an intensity under control of said exposure control unit, when the second video sequence is generated, and
said exposure control unit is operable to control the external image capturing apparatus to change the exposure amount by controlling the illumination unit.

7. An image generation method of generating, from a first video sequence and a second video sequence which are generated by capturing a same object by an external image capturing apparatus, a new video sequence which represents the same object,
wherein the first video sequence includes frames having a first resolution, the second video sequence includes frames having a second resolution which is higher than the first resolution, each frame of the first video sequence is generated during a first duration of a first exposure period, and each frame of the second video sequence is generated during a second duration of a second exposure period which is longer than the first duration of the first exposure period, said image generation method comprising:
controlling the external image capturing apparatus to change an exposure amount during a part of the second exposure period in synchronization with changing of an exposure amount during a part of the first exposure period;
receiving the first video sequence and the second video sequence from the external image capturing apparatus, the second video sequence being captured under said controlling; and
generating, from the first video sequence and the second video sequence received in said receiving, the new video sequence including frames having a resolution which is equal to or higher than the second resolution, at a frame rate which is equal to or higher than a frame rate of the first video sequence, by reducing a difference between (i) a value of each frame in the second video sequence and (ii) a sum of values of frames in the new video sequence which correspond to the second exposure period for the each frame in the second video sequence.

8. A non-transitory computer readable recording medium having stored therein a program for generating a new video sequence from a plurality of video sequences, wherein when executed, said program causing a computer to execute the image generation method according to claim 7.

* * * * *

UNITED STATES PATENT AND TRADEMARK OFFICE
CERTIFICATE OF CORRECTION

PATENT NO. : 7,907,183 B2  
APPLICATION NO. : 12/094370  
DATED : March 15, 2011  
INVENTOR(S) : Taro Imagawa et al.

Page 1 of 1

It is certified that error appears in the above-identified patent and that said Letters Patent is hereby corrected as shown below:

ON THE TITLE PAGE

On page 1, right column, item (57), Abstract, lines 8-9, please change "receiving unit which receives the first video sequence and the second video sequence" to --receiving unit which receives a first video sequence and a second video sequence--.

On page 1, right column, in item (57), Abstract, lines 12-13, please change "having a resolution equal to or higher than the second resolution" to --having a resolution equal to or higher than a second resolution--.

Signed and Sealed this  
Fourteenth Day of February, 2012

David J. Kappos  
*Director of the United States Patent and Trademark Office*